(12) United States Patent
Kim et al.

(10) Patent No.: US 11,545,061 B2
(45) Date of Patent: Jan. 3, 2023

(54) ELECTRONIC DEVICE FOR DISPLAYING SCREEN THROUGH DISPLAY IN LOW-POWER MODE AND OPERATING METHOD THEREOF

(71) Applicant: Samsung Electronics Co., Ltd., Suwon-si (KR)

(72) Inventors: Minseung Kim, Suwon-si (KR); Donghoon Kang, Suwon-si (KR); Miseon Jeong, Suwon-si (KR); Yeunwook Lim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/289,116

(22) PCT Filed: Nov. 1, 2019

(86) PCT No.: PCT/KR2019/014764
§ 371 (c)(1),
(2) Date: Apr. 27, 2021

(87) PCT Pub. No.: WO2020/091538
PCT Pub. Date: May 7, 2020

(65) Prior Publication Data
US 2022/0013053 A1    Jan. 13, 2022

(30) Foreign Application Priority Data
Nov. 2, 2018  (KR) .......................... 10-2018-0133645

(51) Int. Cl.
*G09G 3/20* (2006.01)
*G06V 30/32* (2022.01)
*G06F 3/0354* (2013.01)
*G06F 3/041* (2006.01)
*G06F 3/04883* (2022.01)

(52) U.S. Cl.
CPC ........... *G09G 3/20* (2013.01); *G06F 3/03545* (2013.01); *G06F 3/0416* (2013.01);
(Continued)

(58) Field of Classification Search
CPC ............. G09G 3/20; G09G 2320/0666; G09G 2330/023; G09G 2340/045;
(Continued)

(56) References Cited

U.S. PATENT DOCUMENTS 8,872,796 B2  10/2014  Yoo
9,727,741 B2   8/2017  Bostick et al.
(Continued)

FOREIGN PATENT DOCUMENTS

KR  10-2017-0007051 A   1/2017
KR     10-1756288 B1    7/2017
(Continued)

*Primary Examiner* — Ryan A Lubit
(74) *Attorney, Agent, or Firm* — Jefferson IP Law, LLP

(57) ABSTRACT

An electronic device according to various embodiments may include: a housing; a display panel exposed through part of the housing; a display driver Integrated Circuit (IC) for driving the display panel; a processor located inside the housing and operatively coupled to the display panel and the display driver IC; and a memory located inside the housing and operatively coupled to the processor and the display driver IC. The memory may store instructions, when executed, causing the processor to display a first screen through the display panel, identify whether there is a request for entering a low power state, generate information on a second screen including at least part of the first screen and write the information in the memory, in response to the request for entering the low power state, enter the low power state in response to writing the information, and causing the display driver IC to display the second screen through the display panel, based on the information, written in the
(Continued)

memory, on the second screen, while the processor is in the low power state.

14 Claims, 16 Drawing Sheets

(52) U.S. Cl.
CPC .......... *G06F 3/04883* (2013.01); *G06V 30/32* (2022.01); *G09G 2320/0666* (2013.01); *G09G 2330/023* (2013.01); *G09G 2340/045* (2013.01); *G09G 2354/00* (2013.01)

(58) Field of Classification Search
CPC ........... G09G 2365/00; G09G 2360/02; G09G 2360/18; G06F 1/1626; G06F 1/3206
See application file for complete search history.

(56) References Cited

U.S. PATENT DOCUMENTS

| | | | | |
|---|---|---|---|---|
| 2010/0240415 | A1* | 9/2010 | Kim | G06F 21/32 455/565 |
| 2011/0283241 | A1* | 11/2011 | Miller | G06F 21/36 455/411 |
| 2012/0185803 | A1 | 7/2012 | Wang et al. | |
| 2014/0019855 | A1* | 1/2014 | Kim | G06Q 10/10 715/268 |
| 2014/0372896 | A1* | 12/2014 | Raman | G06F 3/017 715/741 |
| 2015/0286298 | A1* | 10/2015 | Lee | G06F 3/03545 345/179 |
| 2016/0301796 | A1* | 10/2016 | Tuli | G06F 3/0484 |
| 2017/0263206 | A1* | 9/2017 | Bae | G09G 3/2092 |
| 2018/0024708 | A1 | 1/2018 | Kim et al. | |
| 2018/0088892 | A1* | 3/2018 | Park | G09G 3/3233 |
| 2018/0240260 | A1 | 8/2018 | Lee et al. | |
| 2019/0138740 | A1* | 5/2019 | Ricknäs | G06F 21/604 |
| 2019/0259323 | A1 | 8/2019 | Lee et al. | |
| 2020/0257411 | A1 | 8/2020 | Kim et al. | |
| 2021/0026462 | A1 | 1/2021 | Seo et al. | |

FOREIGN PATENT DOCUMENTS

| | | |
|---|---|---|
| KR | 10-2018-0011651 A | 2/2018 |
| KR | 10-2018-0095409 A | 8/2018 |
| KR | 10-2019-0101148 A | 8/2019 |

* cited by examiner

ELECTRONIC DEVICE FOR DISPLAYING SCREEN THROUGH DISPLAY IN LOW-POWER MODE AND OPERATING METHOD THEREOF

TECHNICAL FIELD

Various embodiments relate to an electronic device and method for displaying a screen through a display in a low power state.

BACKGROUND ART

An electronic device such as a smartphone, a table Personal Computer (PC), a smart watch, or the like may visually provide a variety of content such as an image, a text, or the like to a user through a display panel. For example, the electronic device may include a display panel for displaying the content and a Display Driver IC (DDI) for driving the display panel.

DISCLOSURE OF INVENTION

Technical Problem

An electronic device may transition to an inactive state during a user does not use the electronic device. When the electronic device transitions to the inactive state, information displayed through a display of the electronic device may no longer be displayed. Therefore, in order to identify the information displayed through the display, the user may need to persistently or periodically apply an input to the electronic device (e.g., a touchscreen of the electronic device) to maintain the electronic device in an activate state. Since the electronic device maintains the active state to persistently display information through the display, unnecessary power consumption may occur.

Various embodiments may provide an electronic device and method capable of reducing power consumption while enhancing usability, by displaying minimum information required by the user on a screen even if the electronic device transitions to the inactive state.

Technical problems to be achieved in the document are not limited to the technical problems mentioned above, and other technical problems not mentioned herein can be clearly understood by those skilled in the art to which the present invention pertains from the following descriptions.

Solution to Problem

An electronic device according to various embodiments may include: a housing; a display panel exposed through part of the housing; a display driver Integrated Circuit (IC) for driving the display panel; a processor located inside the housing and operatively coupled to the display panel and the display driver IC; and a memory located inside the housing and operatively coupled to the processor and the display driver IC. The memory may store instructions, when executed, causing the processor to display a first screen through the display panel, identify whether there is a request for entering a low power state, generate information on a second screen including at least part of the first screen and write the information in the memory, in response to the request for entering the low power state, and enter the low power state in response to writing the information. The memory may store instructions, when executed, causing the display driver IC to display the second screen through the display panel, based on the information, written in the memory, on the second screen, while the processor is in the low power state.

An electronic device according to various embodiments may include: a housing; a touchscreen display viewed or exposed through part of the housing; a processor located inside the housing and operatively coupled with the touchscreen display; and a memory located inside the housing and operatively coupled with the processor. The memory may be configured to store an application program including a first user interface including an object for transitioning to a lock state. The memory may store instructions, when executed, causing the processor to display a screen on a first user interface in an unlock state of the electronic device, receive a user input for selecting the object through the first user interface in the unlock state of the electronic device, transit the electronic device from the unlock state to a lock state, and display, in the lock state, a second user interface including at least part of the screen on the display.

An electronic device according to various embodiments may include: a housing; a touchscreen display viewed or exposed through part of the housing; at least one sensor; a processor located inside the housing and operatively coupled with the touchscreen display and the sensor; and a memory located inside the housing and operatively coupled with the processor. The memory may store instructions, when executed, causing the processor to display a screen on a first user interface in an unlock state of the electronic device, monitor a surrounding state of the electronic device by using the sensor, transit the electronic device from the unlock state to a lock state, and display, in the lock state, a second user interface including at least part of the screen on the display based at least in part on the monitored surrounding state.

Advantageous Effects of Invention

An apparatus and method according to various embodiments are capable of displaying minimum information required by a user on a screen even if an electronic device transitions to an inactive state, thereby reducing power consumption while enhancing usability.

Advantages acquired in the disclosure are not limited to the aforementioned advantages. Other advantages not mentioned herein can be clearly understood by those skilled in the art to which the disclosure pertains from the following descriptions.

BEST MODE FOR CARRYING OUT THE INVENTION

Figure 1:
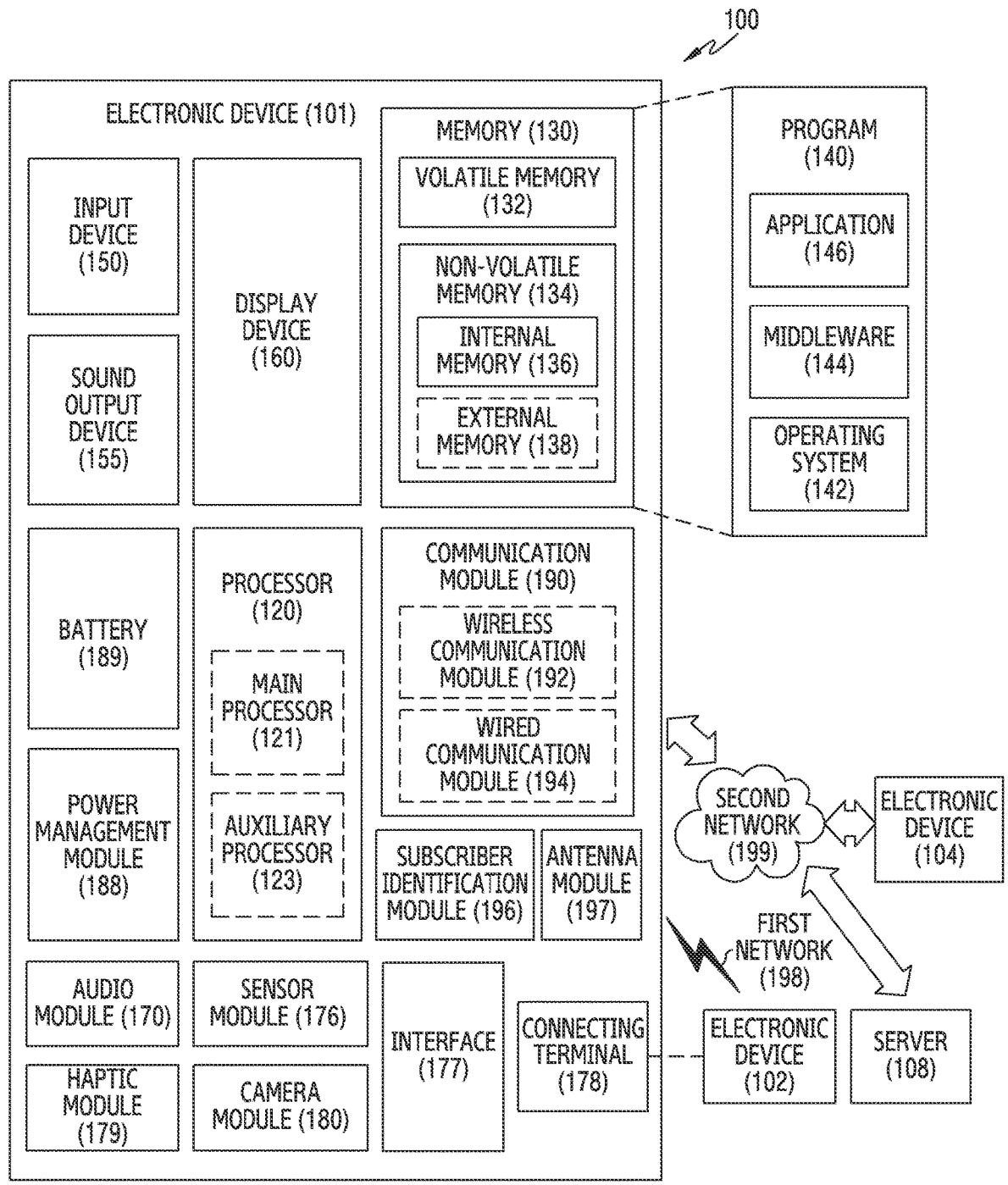
FIG. 1 is a block diagram of an electronic device in a network environment according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module(SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by another component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wired) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wired) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the document, the electronic devices are not limited to those described above.

It should be appreciated that various embodiments of the present document and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wired), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor(e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the document may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
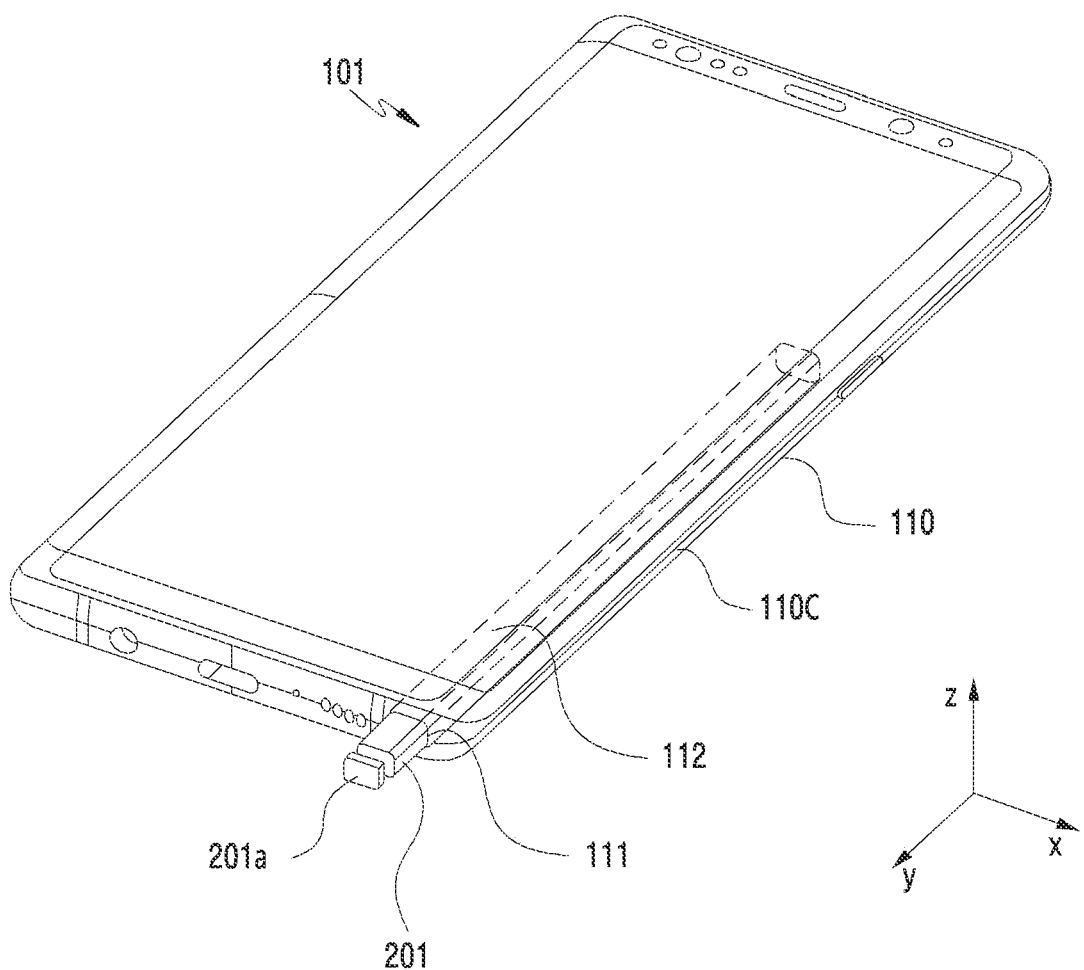
FIG. 2 is a perspective view of an electronic device including a digital pen according to an embodiment.

FIG. 2 is a perspective view of an electronic device including a digital pen according to an embodiment.

Referring to FIG. 2, an electronic device 101 according to an embodiment may include a configuration of FIG. 1, and may include a structure to which a digital pen 201 (e.g., a stylus pen) is inserted. The electronic device 101 may include a housing 110, and a hole 111 may be included in part of the housing 110, for example, part of a side face 110C. The electronic device 101 may include a storage space 112 coupled to the hole 111, and the digital peen 201 may be inserted into the storage space 112. According to the illustrated embodiment, the digital pen 201 may include a button 201a, which can be pressed, at one end so that the digital pen 201 can be easily pulled out from the storage space 112 of the electronic device 101. When the button 201a is pressed, repulsion mechanisms (e.g., at least one spring) configured in association with the button 201a operate, so that the digital pen 201 is separated from the storage space 112.

Figure 3:
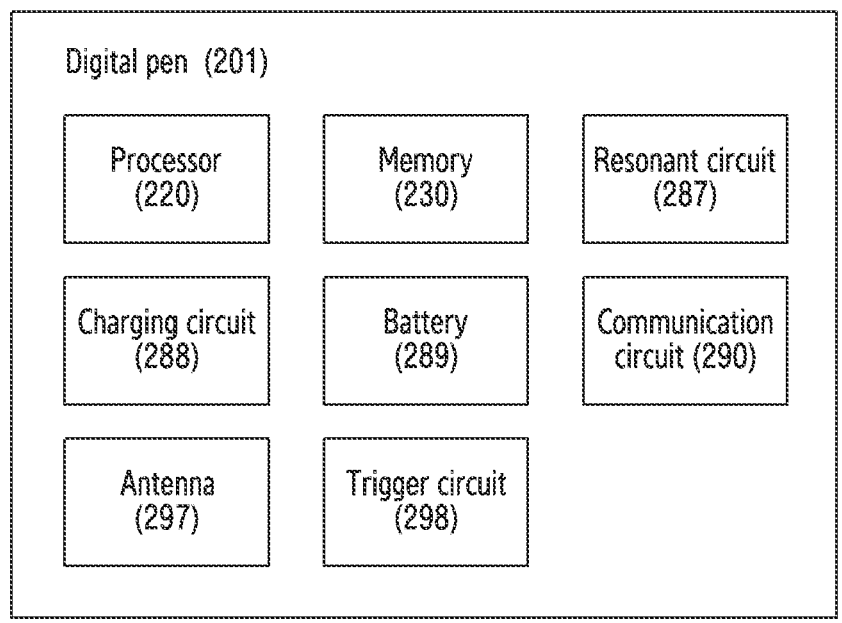
FIG. 3 is a block diagram illustrating a digital pen according to an embodiment.

FIG. 3 is a block diagram illustrating a digital pen according to an embodiment.

Referring to FIG. 3, a digital pen 201 according to an embodiment may include a processor 220, a memory 230, a resonant circuit 287, a charging circuit 288, a battery 289, a communication circuit 290, an antenna 297, and/or a trigger circuit 298. In some embodiments, the processor 220 of the digital pen 201, at least part of the resonant circuit 287, and/or at least part of the communication circuit 290 may be constructed on a Printed Circuit Board (PCB) or in the form of a chip. The processor 220, the resonant circuit 287, and/or the communication circuit 290 may be electrically coupled with the memory 230, the charging circuit 288, the battery 289, the antenna 297, or the trigger circuit 298. The digital pen 201 according to an embodiment may be constructed of only a resonant circuit and a button.

The processor 220 may include a generic processor configured to execute a customized hardware module or software (e.g., an application program). The processor may include a software element (program) or a hardware component (function) including at least one of various sensors provided in the digital pen 201, a data measurement module, an input/output interface, a module for managing a state or environment of the digital pen 201, and a communication module. The processor 220 may include, for example, one of or a combination of two or more of hardware, software, and firmware. According to an embodiment, the processor 220 may receive a proximity signal corresponding to an electromagnetic signal generated from a digitizer of the electronic device 101 through the resonant circuit 287. When the proximity signal is identified, the resonant circuit 287 may be controlled to transmit an Electro-Magnetic Resonance (EMR) input signal to the electronic device 101.

The memory 230 may store information related to an operation of the digital pen 201. For example, the information may include information for communication with the electronic device 101 and frequency information related to an input operation of the digital pen 201.

The resonant circuit 287 may include at least one of a coil, an inductor, and a capacitor. The resonant circuit 287 may be used when the digital pen 201 generates a signal including a resonant frequency. For example, for the signal generation, the digital pen 201 may use at least one of an Electro-Magnetic Resonance (EMR) scheme, an Active ElectoStatic (AES) scheme, and an Electrically Coupled Resonance (ECR) scheme. When the digital pen 201 transmits a signal according to the EMR scheme, the digital pen 201 may generate a signal including a resonant frequency, based on an electromagnetic field generated from an inductive panel of the electronic device 101. When the digital pen 201 transmits a signal according to the AES scheme, the digital pen 201 may generate a signal by using capacity coupling with the electronic device 101. When the digital pen 201 transmits a signal according to the ECR scheme, the digital pen 201 may generate a signal including a resonant frequency, based on an electric field generated from a capacitive device of the electronic device. According to an embodiment, the resonant circuit 287 may be used to change a frequency or strength of an electromagnetic field, based on a user's manipulation state. For example, the resonant circuit 287 may provide a frequency for recognizing a hovering input, a drawing input, a button input, or an erasing input.

When the charging circuit 288 is coupled with the resonant circuit 287, based on a switching circuit, a resonant signal generated from the resonant circuit 287 may be rectified into a Direct Current (DC) signal and provided to the battery 289. According to an embodiment, the digital pen 201 may use a voltage level of the DC signal detected from the charging circuit 288 to determine whether the digital pen 201 is inserted to the electronic device 101.

The battery 289 may be configured to store power required for the operation of the digital pen 201. The battery 289 may include, for example, a lithium-ion battery or a capacitor, and may be rechargeable or exchangeable. According to an embodiment, the battery 289 may be charged by using power (e.g., a DC signal (DC power)) provided from the charging circuit 288.

The communication circuit 290 may be configured to perform a wireless communication function between the digital pen 201 and the communication module 190 of the electronic device. According to an embodiment, the communication circuit 290 may transmit state information and input information of the digital pen 201 to the electronic device 101 by using a short-range communication scheme. For example, the communication circuit 290 may transmit, to the electronic device 101, direction information (e.g., motion sensor data) of the digital pen 201 acquired through the trigger circuit 298, voice information input through a microphone, or information on remaining power of the battery 289. As an example, the short-range communication scheme may include at least one of Bluetooth, Bluetooth Low Energy (BLE), and a wireless Local Area Network (LAN).

The antenna 297 may be used to transmit a signal or power to the outside (e.g., the electronic device 101) or to receive it from the outside. According to an embodiment, the digital pen 201 may include the plurality of antennas 297, and may select at least one of the antennas 297 suitable for a communication scheme. Through the selected at least one antenna 297, the communication circuit 290 may exchange the signal or power with an external electronic device.

The trigger circuit 298 may include at least one button or sensor circuit. According to an embodiment, the processor 220 may identify an input mechanism (e.g., touching or pressing) or type (e.g., an EMR button or a BLE button) of the button of the digital pen 201. According to an embodiment, the sensor circuit may generate an electric signal or data value corresponding to an internal operating state or external environment state of the digital pen 201. For example, the sensor circuit may include at least one of a motion sensor, a sensor for detecting battery remaining power, a pressure sensor, an optical sensor, a temperature sensor, a geomagnetic sensor, and a biometric sensor. According to an embodiment, the trigger circuit 298 may transmit a trigger signal to the electronic device 101 by using an input signal of the button or a signal provided through the sensor 299.

Figure 4:
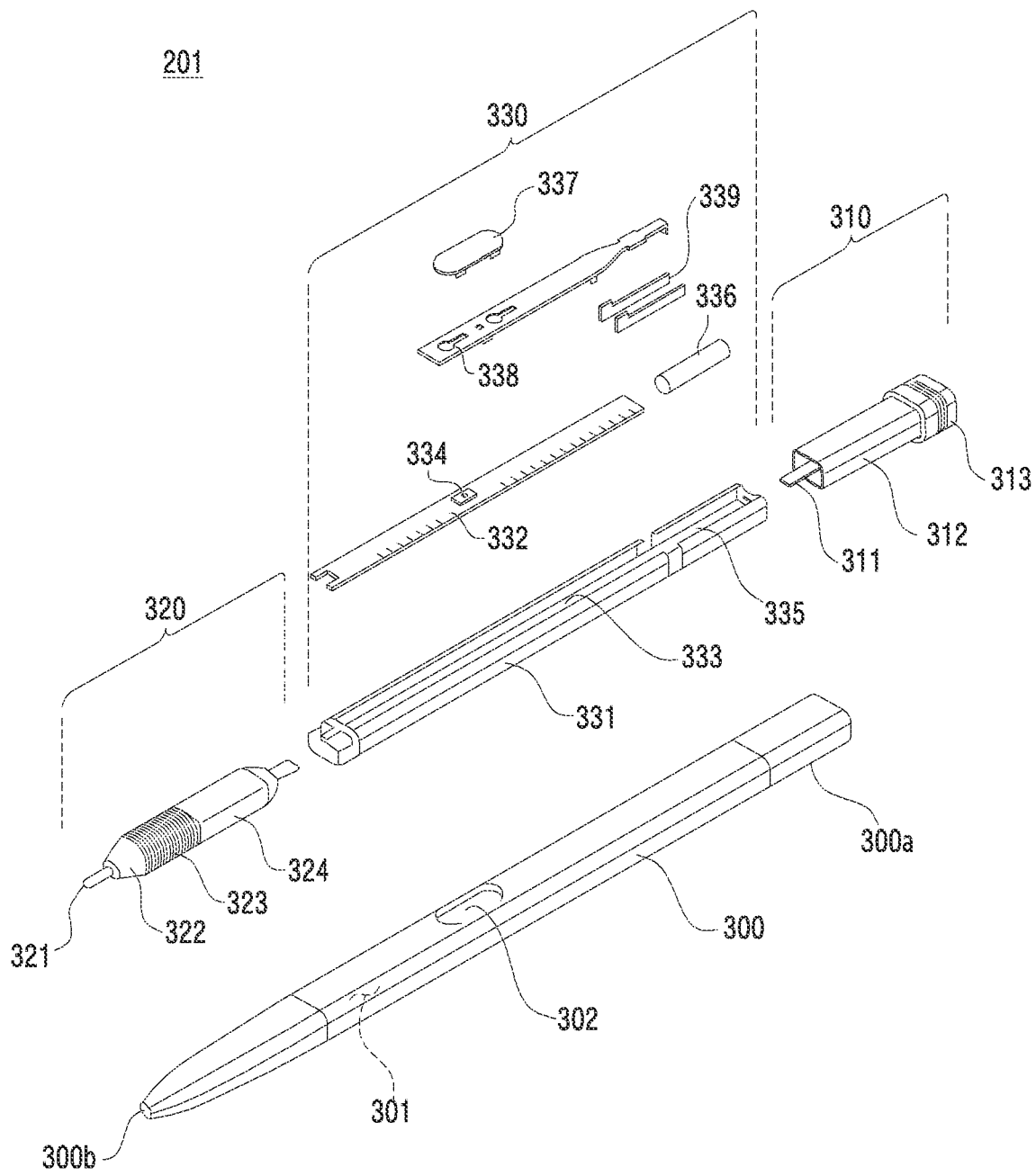
FIG. 4 is an exploded perspective view of a digital pen according to an embodiment.

FIG. 4 is an exploded perspective view of a digital pen according to an embodiment.

Referring to FIG. 4, a digital pen 201 may include a pen housing 300 constituting an exterior of the digital pen 201 and an inner assembly inside the pen housing 300. In the illustrated embodiment, the inner assembly may be inserted into the pen housing 300 by performing an assembly operation one time, including all of several components mounted inside the pen.

The pen housing 300 may have a shape elongated between a first end 300a and a second end 300b, and may include a storage space 301 inside thereof. A cross-section of the pen housing 300 may have a shape of an ellipse constructed of a long axis and a short axis, and may be constructed in a cylindroid shape as a whole. The storage space 112 of the electronic device 101 may also be constructed to have an elliptical cross-section corresponding to a shape of the pen housing 300. The pen housing 300 may include a synthetic resin (e.g., plastic) and/or a metallic material (e.g., aluminum). According to an embodiment, the second end 300b of the pen housing 300 may be constructed of a synthetic resin material.

The inner assembly may have an elongated shape corresponding to the shape of the pen housing 300. The inner assembly may be roughly divided into three types of configurations along a lengthwise direction. For example, the inner assembly may include an ejection member 310 disposed at a location corresponding to the first end 300a of the pen housing 300, a coil portion 320 disposed at a location corresponding to the second end 300b of the pen housing 300, and a circuit board portion 330 disposed at a location corresponding to a body of the pen housing 300.

The ejection member 310 may include a configuration for removing the digital pen 201 from the storage space 112 of the electronic device 101. According to an embodiment, the ejection member 310 may include a shaft 311, an ejection body 312 disposed around the shaft 311 and constituting an overall exterior of the ejection member 310, and a button portion 313. When the inner assembly is completely inserted to the pen housing 300, a portion including the first shaft 311 and ejection body 312 may be surrounded by the first end 300a of the pen housing 300, and the button portion 313 (e.g., 201a of FIG. 2) may be exposed to the outside of the first end 300a. A plurality of components (not shown), e.g., cam members or elastic members, may be disposed in the ejection body 312 to constitute a push-pull structure. In an embodiment, the button portion 313 may be substantially coupled with the shaft 311 to perform a linear reciprocating motion with respect to the ejection body 312. According to various embodiments, the button unit 313 may include a button having a hook structure so that a user can remove the digital pen 201 by using a fingernail. According to an embodiment, the digital pen 201 may provide another input mechanism by including a sensor for detecting the linear reciprocating motion of the shaft 311.

The coil portion 320 may include a pen tip 321, which is exposed to the outside of the second end 300b when the inner assembly is completely inserted to the pen housing 300, a packing ring 322, a coil 323, which is wound several times, and/or a pen pressure sensor 324 for acquiring a pressure change depending on pressure of the pen tip 321. The packing ring 322 may include epoxy, rubber, urethane, or silicone. The packing ring 322 may be disposed for waterproof and dustproof purposes, and may protect the coil portion 320 and the circuit board portion 330 against water permeation or dust. According to an embodiment, the coil 323 may produce a resonant frequency in a set frequency band (e.g., 500 KHz), and may be combined with at least one element (e.g., a capacitive capacitor) to adjust the resonant frequency produced by the coil 323 in a range of a specific level.

The circuit board portion 330 may include a PCB 332, a base 331 surrounding at least one face of the PCB 332, and an antenna. According to an embodiment, a substrate mounting portion 333 to which the PCB 332 is disposed may be constructed on an upper face of the base 331, and the PCB 332 may be fixed in a state of being mounted to the substrate mounting portion 333. According to an embodiment, the PCB 332 may include an upper face and a lower face. A switch 334 or a variable capacitance capacitor coupled to the coil 323 may be disposed on the upper face. A charging circuit, a battery 336, or a communication circuit may be disposed on the lower face. The battery may include an Electronic Double Layered Capacity (EDLC). The charging circuit may be located between the coil 323 and the battery, and may include a voltage detector circuity and a rectifier.

The antenna may include an antenna structure 339 as shown in the example of FIG. 4 and/or an antenna embedded in the PCB 332. According to an embodiment, the switch 334 may be disposed on the PCB 332. A side button 337 disposed to the digital pen 201 may be used to press the switch 334, and may be exposed to the outside through a lateral opening portion 302 of the pen housing 300. The side button 337 may be supported by a support member 338, and when there is no external force acting on the side button 337, the support member 338 may provide elastic restoration force so that the side button 337 is restored or maintained in a state of being disposed at a specific location.

The circuit board portion 330 may include a different packing ring such as an O-ring. For example, an O-ring made of an elastic body may be disposed at both ends of the base 331, so that a sealing structure is constructed between the base 331 and the pen housing 300. In some embodiments, the support member 338 may be closely in contact with an inner wall of the pen housing 300 around the lateral opening portion 302 to construct the sealing structure. For example, the circuit board portion 330 may also include a waterproof and dustproof structure similar to the packing ring 322 of the coil portion 310.

The digital pen 201 may include a battery mounting portion 335 in which the battery 336 is disposed on the upper face of the base 331. The battery 336 mountable to the battery mounting portion 335 may include, for example, a cylinder-type battery.

The digital pen 201 may include a microphone (not shown). The microphone may be coupled directly to the PCB 332 or coupled to an additional Flexible Printed Circuit Board (FPCB) (not shown) coupled to the PCB 332. According to various embodiments, the microphone may be disposed in a lengthwise direction of the digital pen 201 at a position parallel with the side button 337.

Figure 5:
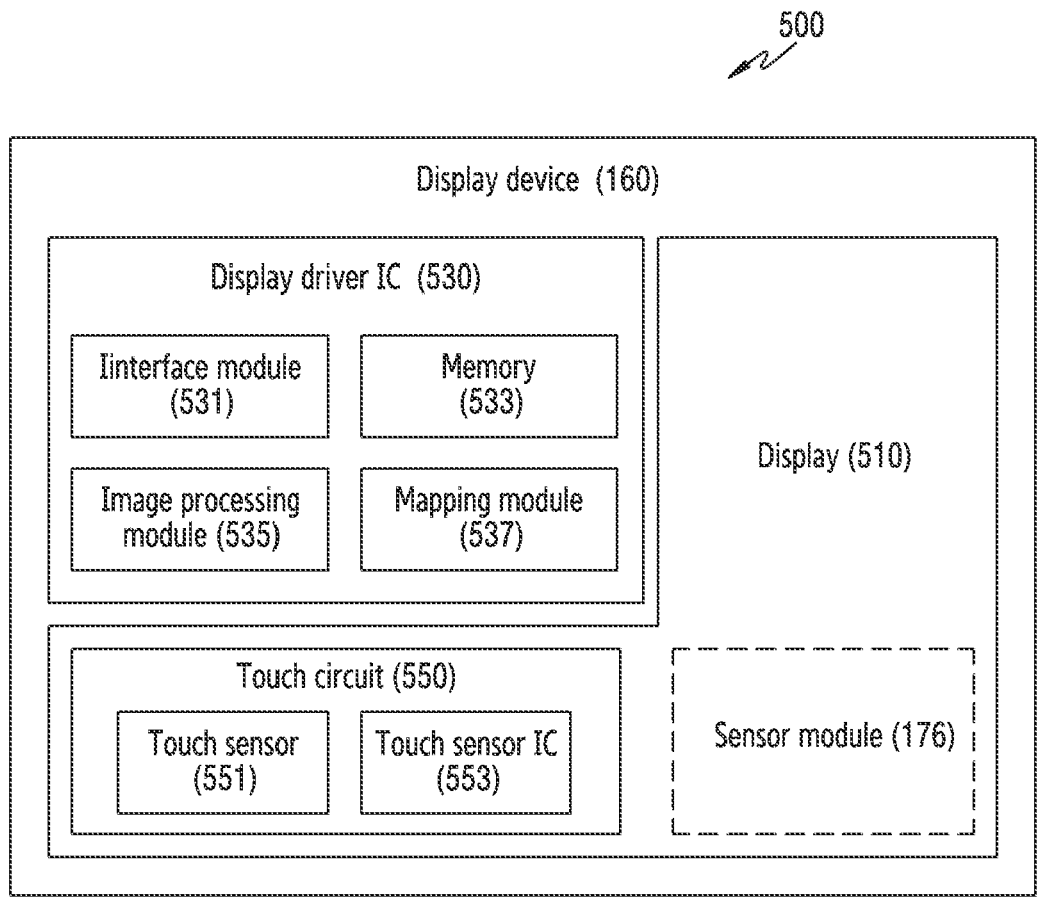
FIG. 5 is a block diagram of a display device according to various embodiments.

FIG. 5 is a block diagram 500 illustrating the display device 160 according to various embodiments.

Referring to FIG. 5, the display device 160 may include a display 510 and a display driver integrated circuit (DDI) 530 to control the display 510. The DDI 530 may include an interface module 531, memory 533 (e.g., buffer memory), an image processing module 535, or a mapping module 537. The DDI 530 may receive image information that contains image data or an image control signal corresponding to a command to control the image data from another component of the electronic device 101 via the interface module 531. For example, according to an embodiment, the image information may be received from the processor 120 (e.g., the main processor 121 (e.g., an application processor)) or the auxiliary processor 123 (e.g., a graphics processing unit) operated independently from the function of the main processor 121. The DDI 530 may communicate, for example, with touch circuitry 150 or the sensor module 176 via the interface module 531. The DDI 530 may also store at least part of the received image information in the memory 533, for example, on a frame by frame basis. The image processing module 535 may perform pre-processing or post-processing (e.g., adjustment of resolution, brightness, or size) with respect to at least part of the image data. According to an embodiment, the pre-processing or post-processing may be performed, for example, based at least in part on one or more characteristics of the image data or one or more characteristics of the display 510. The mapping module 537 may generate a voltage value or a current value corresponding to the image data pre-processed or post-processed by the image processing module 535. According to an embodiment, the generating of the voltage value or current value may be performed, for example, based at least in part on one or more attributes of the pixels (e.g., an array, such as an RGB stripe or a pentile structure, of the pixels, or the size of each subpixel). At least some pixels of the display 510 may be driven, for example, based at least in part on the voltage value or the current value such that visual information (e.g., a text, an image, or an icon) corresponding to the image data may be displayed via the display 510.

According to an embodiment, the display device 160 may further include the touch circuitry 550. The touch circuitry 550 may include a touch sensor 551 and a touch sensor IC 553 to control the touch sensor 551. The touch sensor IC 553 may control the touch sensor 551 to sense a touch input or a hovering input with respect to a certain position on the display 510. To achieve this, for example, the touch sensor 551 may detect (e.g., measure) a change in a signal (e.g., a voltage, a quantity of light, a resistance, or a quantity of one or more electric charges) corresponding to the certain position on the display 510. The touch circuitry 550 may provide input information (e.g., a position, an area, a pressure, or a time) indicative of the touch input or the hovering input detected via the touch sensor 551 to the processor 120. According to an embodiment, at least part (e.g., the touch sensor IC 553) of the touch circuitry 550 may be formed as part of the display 510 or the DDI 530, or as part of another component (e.g., the auxiliary processor 123) disposed outside the display device 160.

According to an embodiment, the display device 160 may further include at least one sensor (e.g., a fingerprint sensor, an iris sensor, a pressure sensor, or an illuminance sensor) of the sensor module 176 or a control circuit for the at least one sensor. In such a case, the at least one sensor or the control circuit for the at least one sensor may be embedded in one portion of a component (e.g., the display 510, the DDI 530, or the touch circuitry 150)) of the display device 160. For example, when the sensor module 176 embedded in the display device 160 includes a biometric sensor (e.g., a fingerprint sensor), the biometric sensor may obtain biometric information (e.g., a fingerprint image) corresponding to a touch input received via a portion of the display 510. As another example, when the sensor module 176 embedded in the display device 160 includes a pressure sensor, the pressure sensor may obtain pressure information corresponding to a touch input received via a partial or whole area of the display 510. According to an embodiment, the touch sensor 551 or the sensor module 176 may be disposed between pixels in a pixel layer of the display 510, or over or under the pixel layer.

The electronic device 101 according to various embodiments may include the processor 120, the Display Driver IC (DDI) 530, and the display 510 (e.g., a display panel).

In various embodiments, the processor 120 may identify whether it is required to change a screen mode of the electronic device 101. The screen mode may include a normal mode and an Always On Display (AOD) mode. The normal mode may imply a mode in which the processor 120 displays a screen through the display 510 while in an active state. The active state may imply a state in which a Power Management Integrated Circuit (PMIC) of the electronic device 101 provides steady state power to the processor 120. The normal mode may imply a mode in which the processor 120 controls the DDI 530 to display the screen through the display 510. When the screen is displayed based on the normal mode, the processor 120 may operate in the active state. The AOD mode may imply a mode in which the processor 120 displays the screen through the display 510 while in an inactive state. The inactive state may imply a turn-off state in which booting is requested for a transition to the active state. The inactive state may imply a state in which the providing of power to the processor 120 by the PMIC of the electronic device 101 is limited. The inactive state may imply a state in which the processor 120 requests to obtain normal power from the PMIC without the requesting for the booting for the transition to the active state. The inactive state may imply a state in which an operation is performed by obtaining lower power than reference power from the PMIC of the electronic device 101. The inactive state may include one or more of a lock state, a standby state, and a low power state. The AOD mode may imply a mode in which the processor 120 is in the inactive state for at least part of a duration in which the screen is displayed through the display 510. The processor 120 may identify whether it is required to change the screen mode of the electronic device 100 from the normal mode to the AOD mode, or whether it is required to change the screen mode of the electronic device 101 from the AOD mode to the normal mode. For example, the processor 120 may use a timer included in the electronic device 101 to monitor whether a user input is detected within a specified time. When it is identified that the user input is detected within the specified time, the screen mode may be maintained to the normal mode. When it is identified that the user input is not detected within the specified time, the screen mode may be changed to the AOD mode. As another example, the processor 120 may monitor whether a user input for deactivating the display 510 of the electronic device 101 is detected. When it is identified that the user input for deactivating the display 510 is detected, the screen mode may be changed from the normal mode to the AOD mode. However, the disclosure is not limited thereto. In some embodiments, the user input for deactivating the display 510 may include a touch input for a visual object (e.g., an icon, a soft button) included in the screen. According to some embodiments, the user input for deactivating the display 510 may include a specified gesture (e.g., a double-tap) input or a specified motion of the electronic device 101 (e.g., a motion of putting the electronic device 101 upside down on a desk), detected through at least one sensor (e.g., an accelerometer, a geomagnetic sensor, a gravity sensor, etc.).

In various embodiments, the processor 120 may provide or transmit, to the DDI 530, information indicating that it is required to change the screen mode of the electronic device 101 to the AOD mode, based on the identifying that it is required to change the screen mode to the AOD mode. For example, the information indicating that it is required to change the screen mode of the electronic device 101 to the AOD mode may be stored in a register (not shown) included in the DDI 530.

In various embodiments, the processor 120 may identify that it is required to change the screen mode from the normal mode to the AOD mode, while displaying a first screen in the normal mode. In response to the identifying that it is required to change the screen mode to the AOD mode, the processor 120 may generate or obtain information on a second screen which is to transition from the first screen and which is to be displayed in the AOD mode. The second screen may be a screen to be displayed through the display 510 while the electronic device 101 operates in the AOD mode. The second screen may be displayed to show content corresponding to content of the first screen through the display 510, while the electronic device 101 operates in the AOD mode. Information on the second screen may be generated based on information on the first screen.

The processor 120 may generate the information on the second screen to be displayed in the AOD mode, based on the first screen in the normal mode. For example, the processor 120 may generate the information on the second screen, based at least in part on extracting part of content included in the first screen so as to be displayed on the second screen. The processor 120 may generate the information on the second screen, based at least in part on resizing part of the content included in the first screen. The processor 120 may control the DDI 530 to change color or brightness of part of the content included in the first screen so as to be displayed on the second screen in the AOD mode. For example, an On Pixel Ratio (OPR) for the entirety of the display 510 may be limited to be less than or equal to a specified level (e.g., 10%) so as to operate in the low power state. Therefore, in order to satisfy the OPR less than or equal to the specified level when the second screen is displayed in the AOD mode, the processor 120 may resize part of the content included in the first screen or change the color or brightness of the content included in the first screen to generate the information on the second screen.

In various embodiments, the processor 120 may provide or transmit, to the DDI 530, information on the second screen to be displayed in the AOD mode (or information on content to be included in the second screen), based on identifying that it is required to change the screen mode to the AOD mode. The content may include one or more of an image, a text, a visual object, and an indication. The information on the second screen may be compressed for transmission to the DDI 530. The information on the second screen may be stored in the memory 533 (e.g., a Graphic Random Access Memory (GRAM)) included in the DDI 530. In other words, the processor 120 may write the information on the second screen in the memory 533. Thereafter, the processor 120 may transition to an inactive state to enter the AOD mode.

In various embodiments, the DDI 530 may receive or obtain, from the processor 120, information indicating that it is required to change the screen mode of the electronic device 101 to the AOD mode. The DDI 530 may store the information indicating that it is required to change the screen mode to the AOD mode in the register included in the DDI 530.

In various embodiments, the DDI 530 may receive or obtain, from the processor 120, the information on the second screen to be displayed through the display 510 while the electronic device 101 operates in the AOD mode. The DDI 530 may write the information on the second screen, obtained from the processor 120, in the memory 533 included in the DDI 530. The DDI 530 may display the second screen through the display 510, based on the information on the second screen, written in the GRAM, while the processor 120 is in the inactive state.

Although it is illustrated in FIG. 5 that the memory 533 is included in the DDI 530, this is for exemplary purposes only, and the embodiment of the present invention is not limited thereto. For example, the memory 533 may be included in the display 160 as a separate entity or may be included in the memory 130.

Figure 6:
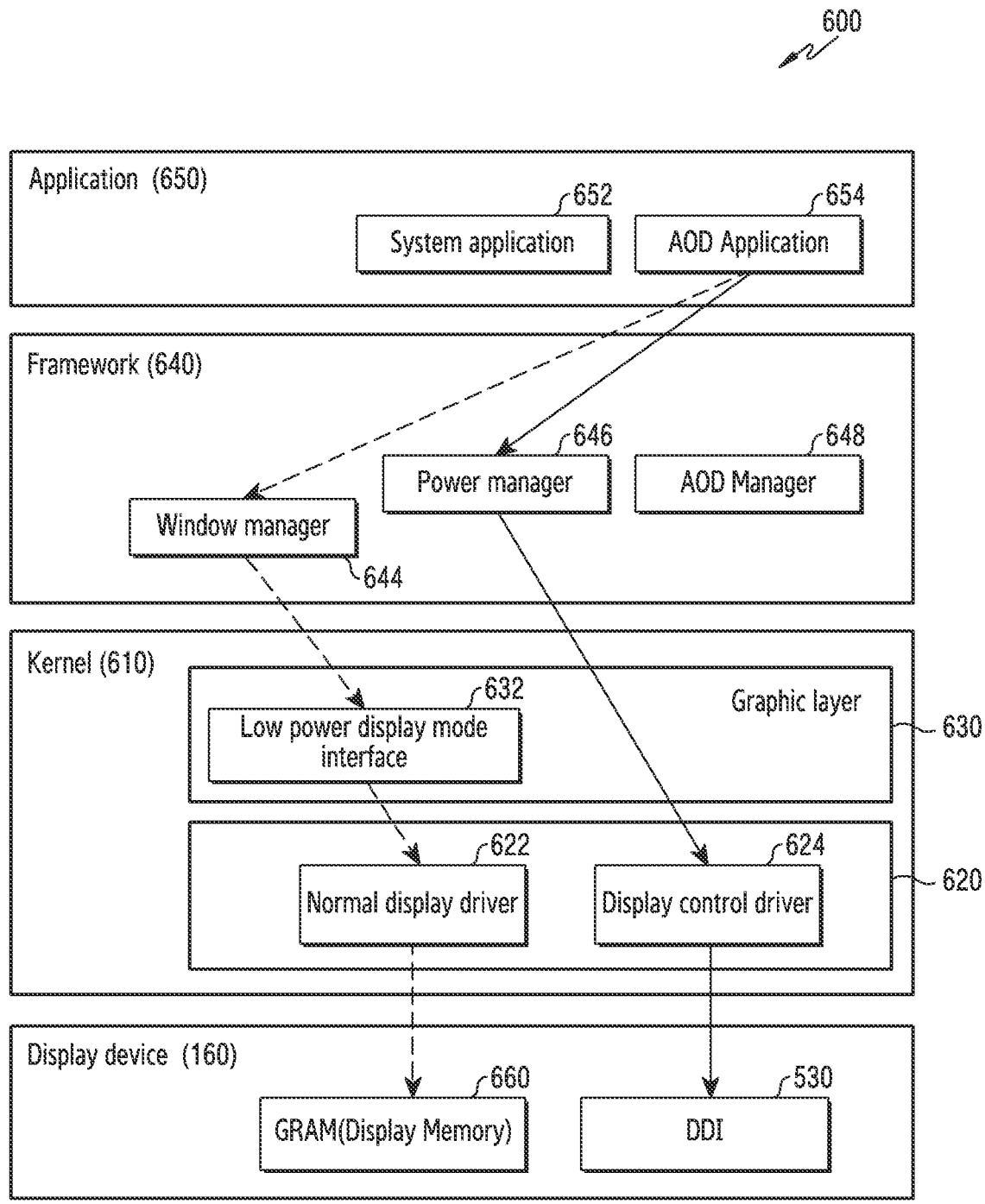
FIG. 6 is a block diagram of a program for controlling an Always On Display (AOD) mode in an electronic device according to various embodiments.

FIG. 6 is a block diagram of a program 600 for controlling an AOD mode in the electronic device 101 according to various embodiments.

Referring to FIG. 6, the program 600 (e.g., the program 140 of FIG. 1) may include an Operating System (OS) (e.g., the OS 142 of FIG. 1) to control a resource related to the electronic device 101 and/or various applications 650 (e.g., the application 146 of FIG. 1) executed on the OS. For example, the OS may include Android™, iOS™, Windows™, Symbian™, Tizen™, or Bada™.

According to an embodiment, the processor 600 may include a kernel 610 (e.g., the OS 142 of FIG. 1), a framework 640 (e.g., the middleware 144 of FIG. 1), and the application 650 (e.g., the application 146 of FIG. 1). At least part of the program 600 may be pre-loaded on the electronic device 101 during manufacture, or may be downloaded from or updated by an external electronic device (e.g., the electronic device 102 or 104, or the server 108) in a user's usage environment.

According to an embodiment, the application 650 may include a system application 652 or an AOD application 654. For example, when a screen mode of the electronic device 101 is changed to the AOD mode, the AOD application 654 may provide control to generate screen information (e.g., content) to be displayed through the display device 160 while operating in the AOD mode. When a notification event occurs while the electronic device 101 operates in the AOD mode, the AOD application 654 may provide control to generate content corresponding to the notification event. For example, when a Hybrid Low Power Mode (HLPM) or an AMOLED Low Power Mode (ALPM) is selected as the AOD mode of the electronic device 101, the AOD application 654 may control the DDI 530 to display content on a display panel (e.g., the display 510), based on the selected mode.

According to an embodiment, the framework 640 may provide the application 650 with various functions so that the application 650 can use a function or information provided by one or more resources of the electronic device 101. For example, the framework 640 may include a window manager 644, a power manage 646, or an AOD manager 648. For example, the framework 640 may dynamically delete some of the existing components or add new components. For example, the window manager 644 may manage a GUI resource used in a screen. For example, the window manager 644 may generate a window corresponding to content to be displayed on the display 510 by using display information generated through at least one view.

The power manager 646 may manage capacity, temperature, or power of a battery, and determine or provide power information to be used for the operation of the electronic device 101, based at least in part on corresponding information of the capacity, temperature, or power of the battery. For example, the power manager 646 may supply power corresponding to a power consumption level or screen mode of the electronic device 101, based on the control of the AOD application 654. For example, when the electronic device 101 operates in the HLPM or the ALPM, the AOD manager 648 may provide state information of the electronic device 101 to the AOD application 654. When the electronic device 101 operates in the HLPM or the ALPM, the AOD manager 648 may control brightness of the display 510, based on the power consumption level of the electronic device 101.

According to an embodiment, the kernel 610 (e.g., the OS 142 of FIG. 1) may control (e.g., allocate or deallocate) a system resource (e.g., process, memory, or power) of the electronic device 101. The kernel 610 may include one or more drivers 620 to drive other hardware devices (e.g., the display device 160) of the electronic device 101. For example, the drivers 620 may include a normal display driver 622 or a display control driver 624. For example, the normal display driver 622 may store content data received through an interface of a graphic layer 630 in a GRAM 660 of the display device 160 (e.g., the memory 533 of FIG. 5). For example, when the content data is received through a low power display mode interface 632 of the graphic layer 630, the normal display driver 622 may determine that corresponding content data is content data to be displayed during the AOD mode.

The display control driver 624 may control the operation of the DDI 530, based on the HLPM or the ALPM. For example, the display control driver 624 may determine the number of colors to be used to display content on the display panel, based on one of the HLPM and the ALPM.

Although it is illustrated in FIG. 6 that the GRAM 660 is separated from the DDI 530, this is for exemplary purposes only, and the embodiment of the present invention is not limited thereto. For example, the GRAM 660 may be included in the DDI 530, or may be included in the memory 130.

Figure 7:
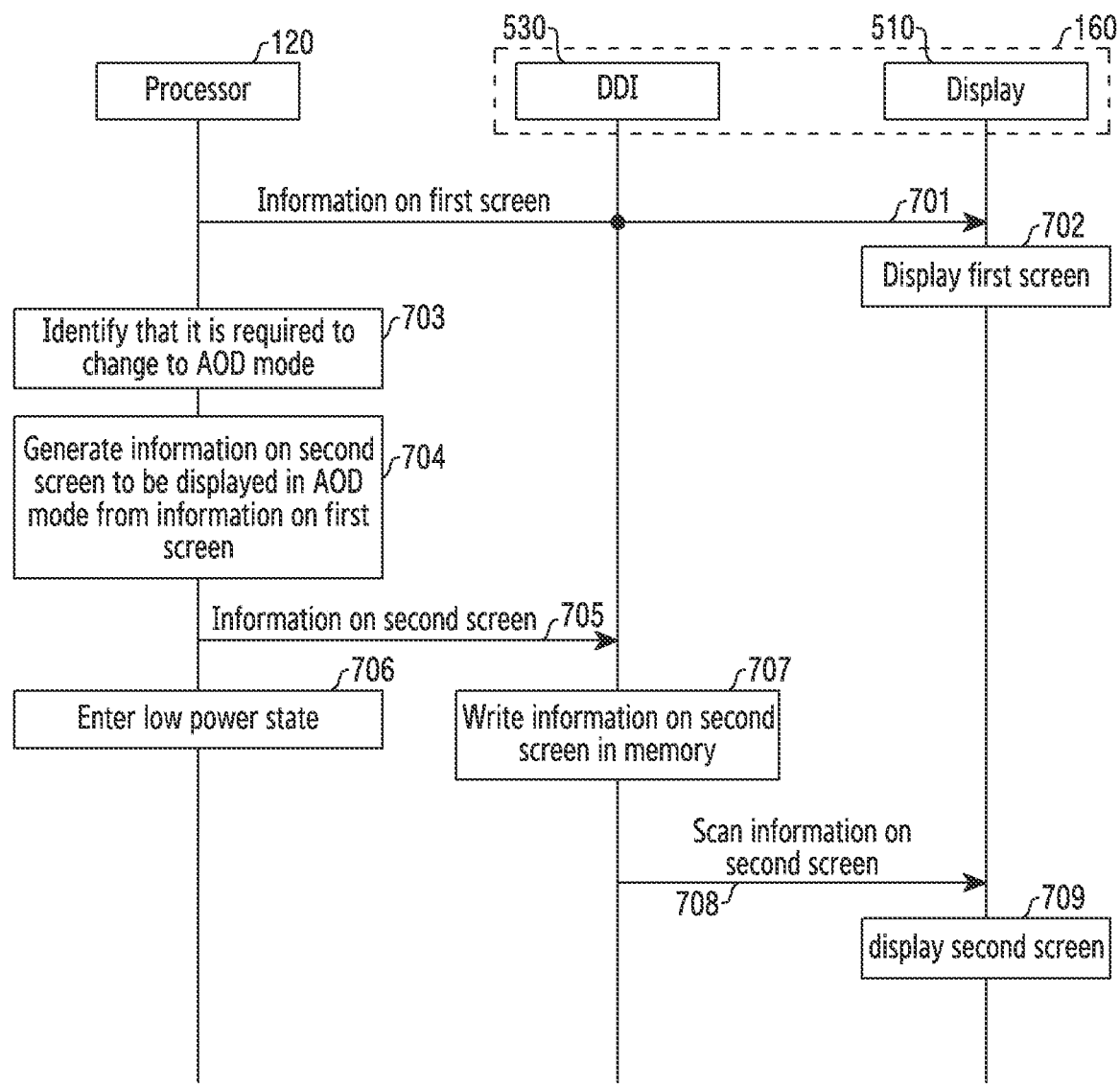
FIG. 7 illustrates an example of a signal flow among a processor, a Display Driver IC (DDI), and a display, in an electronic device according to various embodiments.
Figure 8:
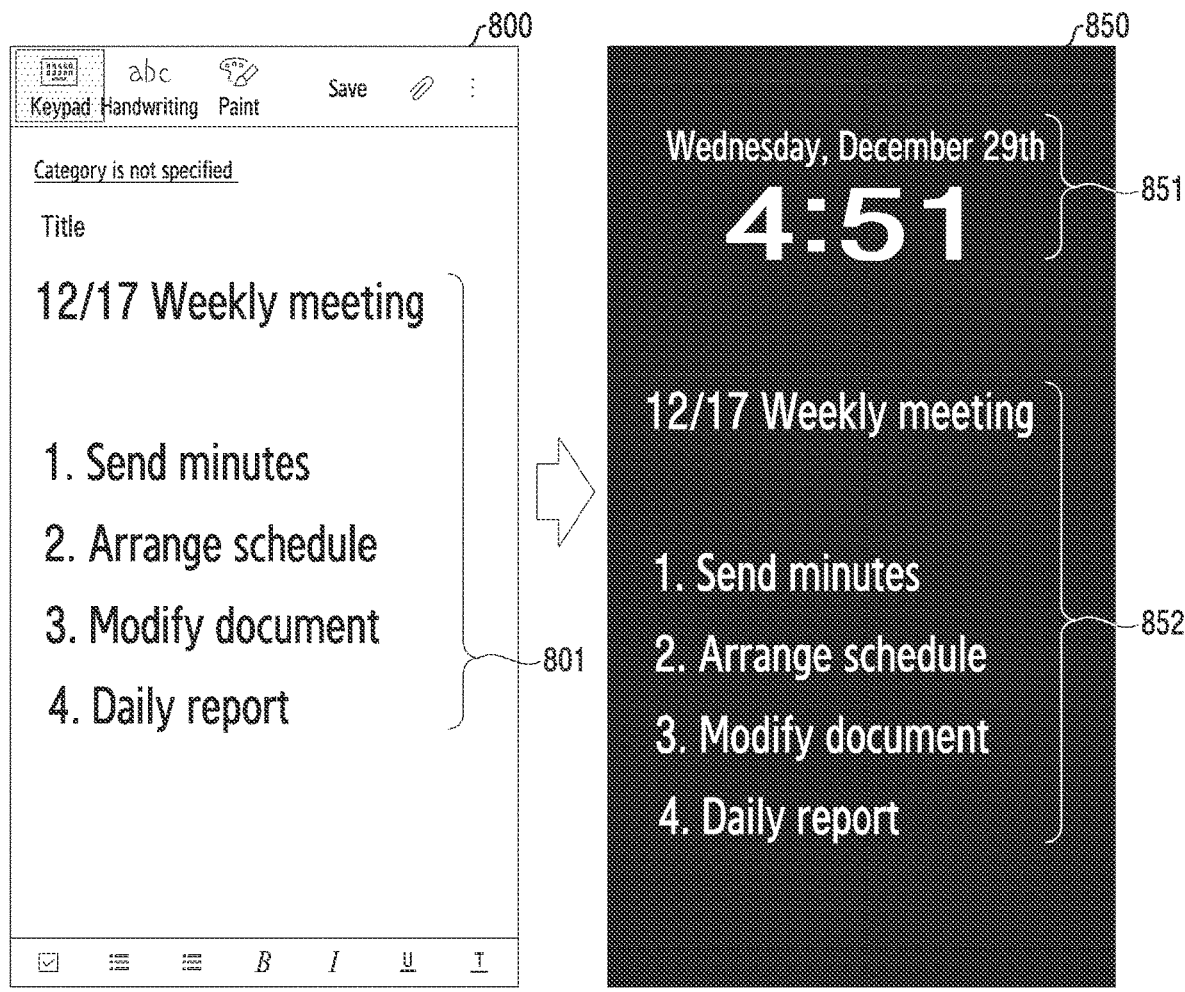
FIG. 8 illustrates an example of a screen transition based on a transition to an AOD mode, in an electronic device according to various embodiments.

FIG. 7 illustrates an example of a signal flow among the processor 120, the DDI 530, and the display 510, in the electronic device 101 according to various embodiments. FIG. 8 illustrates an example of a screen transition based on a transition to an AOD mode, in an electronic device according to various embodiments.

Referring to FIG. 7, in operation 701, the processor 120 may provide or transmit information on a first screen to the DDI 530 to display the first screen through the display 510 of the display device 160. The DDI 530 may control the display 510 to display the first screen, based on the information on the first screen, received from the processor 120. While the processor 120 provides the information on the first screen to the DDI 530 in operation 701, the processor 120 may be in an active state.

In operation 702, the display 510 may display the first screen under the control of the DDI 530. The first screen may be a screen displayed through the display 510 in a normal mode in which the processor 120 operates in the active state. For example, referring to FIG. 8, a first screen 800 may be displayed in the normal mode. The first screen 800 may be, for example, a memory application screen in which a memo is input by a user. Although not shown in FIG. 8, according to some embodiments, the first screen 800 may include a visual object (e.g., icon, soft button) for transitioning to the AOD mode. The first screen is not limited to the memo application screen, and may be any screen.

In operation 703, the processor 120 may identify that it is required to change the screen mode from the normal mode to the AOD mode. In other words, the processor 120 may identify whether there is a request for entering a low power state. For example, the processor 120 may identify that it is required to change to the AOD mode, based on identifying that a user input is not detected in the electronic device 101 during a specified period of time after the first screen is displayed. As another example, the processor 120 may identify that it is required to change to the AOD mode, based on receiving of a touch input for the visual object (e.g., icon, soft button) included in the first screen, during displaying the first screen. As another example, the processor 120 may identify that it is required to change to the AOD mode, in response to a specified gesture (e.g., a double-tap) input or a specified motion (e.g., a motion of putting the electronic device 101 upside down on a desk) detected through at least one sensor (e.g., an accelerometer, a geomagnetic sensor, a gravity sensor, etc.). As another example, the processor 120 may identify that it is required to change to the AOD mode, based on a situation of the electronic device 101 monitored by using at least one sensor (e.g., a position sensor and/or a camera). Detailed descriptions on an example of changing to the AOD mode based on the situation of the electronic device 101 will be described below with reference to FIG. 16.

In operation 704, the processor 120 may generate information on a second screen to be displayed in the AOD mode, from the information on the first screen displayed in the normal mode, based on the identification. The second screen may be a screen for showing content included in the first screen in the low power state. The processor 120 may generate the information on the second screen, based on the information on the first screen. For example, referring to FIG. 8, the processor 120 may generate information on a second screen 850 which is to transition from the first screen 800 and which is to be displayed in the AOD mode, based on information on the first screen 800 in the normal mode.

In various embodiments, the processor 120 may extract part of the content included in the first screen to display the second screen in the AOD mode. For example, the processor 120 may extract only content 801 which is input by a user, except for content provided as a default background, from the first screen 800 which is a memo application screen. The processor 120 may resize the extracted content 801 to display it on the second screen 850 in the low power state. For example, the processor 120 may reverse color or change the color into black and white to satisfy an On Pixel Ratio (OPR) less than or equal to a specified level while the second screen 850 is displayed. The processor 120 may generate information on resized content 852, based on the content 801 extracted from the first screen 800, to display it on the second screen 850.

According to an embodiment, when an area occupied by the content 801 which is input by the user exceeds a specified area or when an area of the resized content 852 exceeds the specified area, the processor 120 may change (e.g., reduce) brightness of the content 852. By changing the brightness of the content 852, the processor 120 may satisfy the OPR less than or equal to the specified level and operate in the low power state, while the second screen 850 is displayed.

According to an embodiment, when the area occupied by the content 801 which is input by the user exceeds the specified area or when the area of the resized content 852 exceeds the specified area, the processor 120 may extract part of the content 801 input by the user, so that only part of the content 801 input by the user is selectively displayed on the second screen 850. For example, the processor 120 may extract the most recently input paragraph from the content 801 input by the user. Since the extraction is performed so that only part of the content 801 input by the user is displayed on the second screen 850, the processor 120 may satisfy the OPR less than or equal to the specified level and may operate in the low power state while the second screen 850 is displayed.

In various embodiments, the processor 120 may further generate specified information (e.g., current time), other than the part of content included in the first screen 800 (e.g., content 801), as information on the second screen 850. For example, the information on the second screen 850 may include information on a visual object 851 indicating current time (e.g., information on a coordinate, disposition, size, etc.) and information on the content 852 for showing the content 801 included in the first screen (e.g., information on a coordinate, disposition, size, etc.).

An example for an operation in which the processor 120 generates the information on the second screen will be described below in detail with reference to FIG. 9 to FIG. 13.

In operation 705, the processor 120 may provide or transmit the information on the second screen to the DDI 530. The DDI 530 may receive or obtain the information on the second display to be displayed through the display 510 from the processor 120 while the electronic device 101 operates in the AOD mode.

In operation 706, the processor 120 may enter the low power state (or inactive state) after transmitting the information on the second screen to the DDI 530.

In operation 707, the DDI 530 may write the information on the second screen, received from the processor 120, in the memory 533 (or the GRAM 660) included in the DDI 530.

In operation 708, the DDI 530 may scan the information on the second screen, written in the memory 533 (or the GRAN 660), to display the second screen while the processor 120 is in the low power state. The DDI 530 may control the display 510 to display the second screen, based on the information on the second screen and written in the GRAM 660.

In operation 709, the display 510 may display the second screen under the control of the DDI 530. For example, referring to FIG. 8, the display 510 may display the second screen 850 which has transitioned from the first screen 800 since the electronic device 101 transitions from the normal mode to the AOD mode. The second screen 850 may have a black background to satisfy an OPR less than or equal to a specified level. The second screen 850 may include the visual object 851 indicating current time and the content 852 for showing the content 801 included in the first screen 800. By showing the content 852 corresponding to the first screen 800 through the second screen 850, even if the electronic device 101 enters the AOD mode, content of an application (e.g., a memo application, an e-book, a web browser, a calendar, etc.) used by a user can be continuously (or seamlessly) provided.

Figure 9:
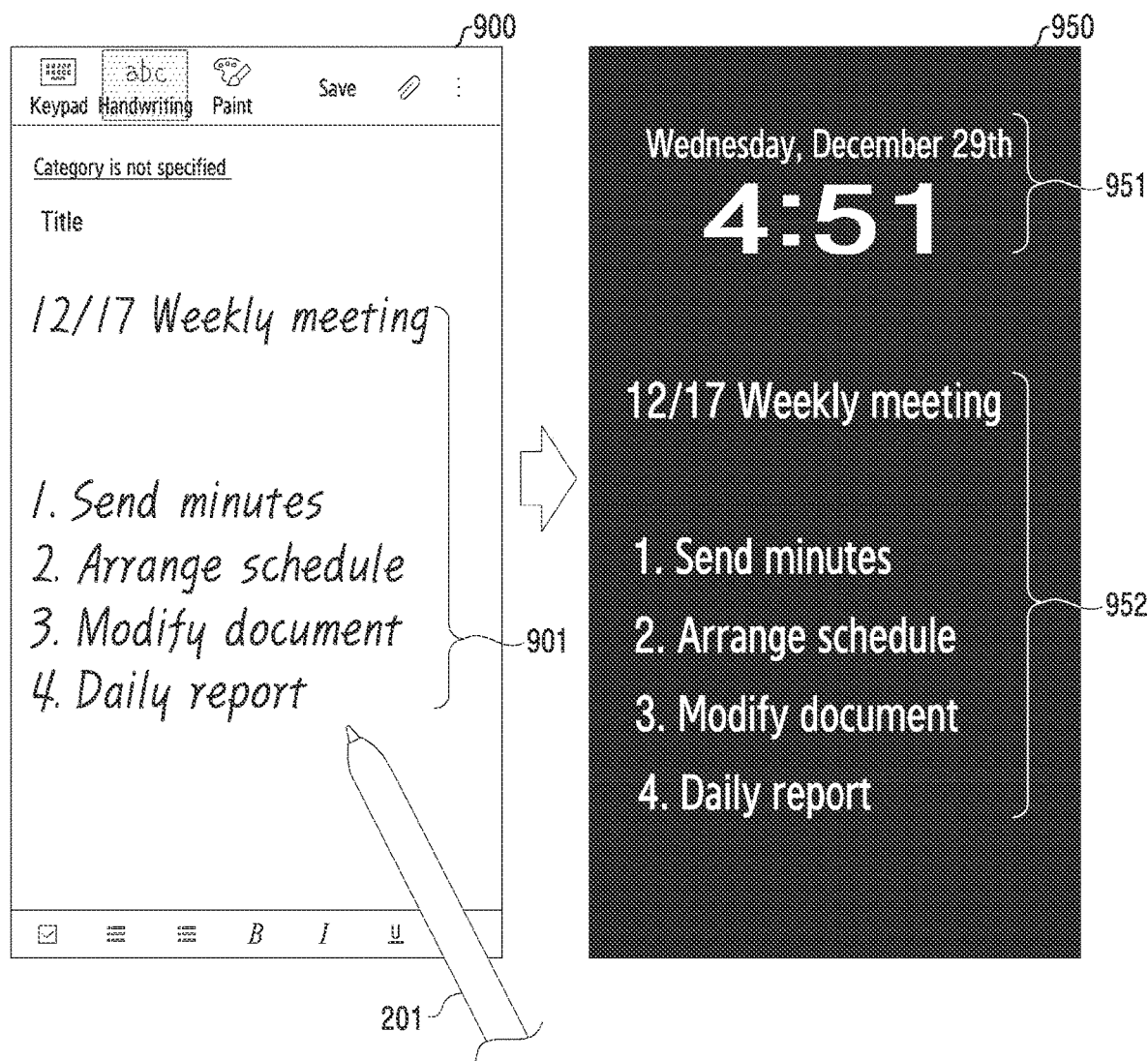
FIG. 9 illustrates another example of a screen transition based on a transition to an AOD mode, in an electronic device according to various embodiments.

FIG. 9 illustrates another example of a screen transition based on a transition to an AOD mode, in an electronic device according to various embodiments.

Referring to FIG. 9, the electronic device 101 may display a first screen 900 as a memo application screen in a normal mode. For example, it may be a situation where a user of the electronic device 101 executes a memo application of the electronic device 101 during a meeting. The electronic device 101 may receive a handwriting (or handwritten lettering) input from the user through the memo application, and may display the received handwriting on the first screen 900. The handwriting may be input, for example, by using the digital pen 201. In a situation where the first screen 900 is displayed, the electronic device 101 may identify that it is required to enter the AOD mode, in response to identifying that a user input is not detected during a specific time. The electronic device 101 may generate information on a second screen 950 to be displayed in the AOD mode, in response to identifying of the entering the AOD mode.

In various embodiments, the electronic device 101 may extract content to be displayed on the second screen 950, from the first screen 900. For example, the electronic device 101 may extract only a handwriting 901 which is input by the user, except for content provided as a default background of the first screen 900 so as to be displayed on the second screen 950.

In various embodiments, the electronic device 101 may convert the handwriting 901 input by the user into text data for readability. For example, the electronic device 101 may convert the handwriting 901 into the text data through Optical Character Recognition (OCR). The electronic device 101 may generate information on the second screen 950 so that the text data converted from the handwriting 901 is included. Due to the transition from the normal mode to the AOD mode, the electronic device 101 may display the second screen 950 in which the handwriting 901 of the first screen 900 is converted into the text data. The second screen 950 may include, for example, a visual object 951 indicating a current time and a text 952 converted from the handwriting 901 included in the first screen 900.

Although not shown, the electronic device 101 may display the second screen 950 including content having a handwriting shape, according to the handwriting 901 input to the first screen 900. For example, the electronic device 101 may display content corresponding to the handwriting 901 in the second screen 950 by resizing the handwriting 901 input to the first screen 900. According to an embodiment, in order to improve readability, the electronic device 101 may uniformly adjust a thickness of the handwriting 901 input to the first screen and display it on the second screen 950. In order to improve readability, the electronic device 101 may recognize the thickness of the handwriting 901 input to the first screen and perform a bold process on a thin portion, and display it on the second screen 950.

Figure 10:
FIG. 10 illustrates another example of a screen transition based on a transition to an AOD mode, in an electronic device according to various embodiments.

FIG. 10 illustrates another example of a screen transition based on a transition to an AOD mode, in an electronic device according to various embodiments.

Referring to FIG. 10, the electronic device 101 may display a first screen 1000 in a normal mode. The first screen 1000 may represent a calendar application screen. The first screen 1000 may include a handwriting 1001 input by a user on the calendar application screen. The handwriting 1001 may be input, for example, by the digital pen 201 or a body part (e.g., a finger) of a user. When a user input is not detected for a specified time in a situation where the first screen 1000 is displayed, the electronic device 101 may enter the AOD mode. Due to the entering the AOD mode, in order to display a second screen 1050 which has transitioned from the first screen 1000, the electronic device 101 may generate or obtain information on the second screen 1050.

In order to generate information on the second screen 1050, the electronic device 101 may extract the handwriting 1001 input by the user, except for content (e.g., a calendar) displayed as a default background of the first screen 1000. The electronic device 101 may improve readability of the second screen 1050 by excluding the default background of the first screen 1000 to display the second screen 1050. Since the default background of the first screen 1000 is excluded to display the second screen 1050, the electronic device 101 may satisfy an OPR less than or equal to a specified level and may operate in a low power state.

The electronic device 101 may display the second screen 1050, in response to identifying that the user input is not detected during the specified time in the situation where the first screen 1000 is displayed. The second screen 1050 may be a screen displayed in the AOD mode. The second screen 1050 may include content 1052 corresponding to the handwriting 1001 input by a user through the first screen 1000 in the normal mode. The content 1052 may be displayed in the form of a handwriting in response to the handwriting 1001, or may be displayed in the form of text converted from the handwriting 1001. The second screen 1050 may include an object 1051 indicating an application type. The object 1051 may indicate which application is being executed in the normal mode before transitioning to the second screen 1050.

The processor 120 of the electronic device 101 may generate information on the second screen 1050, in response to identifying that it is required to change to the AOD mode. The information on the second screen 1050 may include an object 1053 indicating a current time and a coordinate thereof, the object 1051 indicating an application corresponding to the first screen 1000 and a coordinate thereof, and the content 1052 indicating the handwriting 1001 included in the first screen 1000 and a coordinate thereof.

Figure 11:
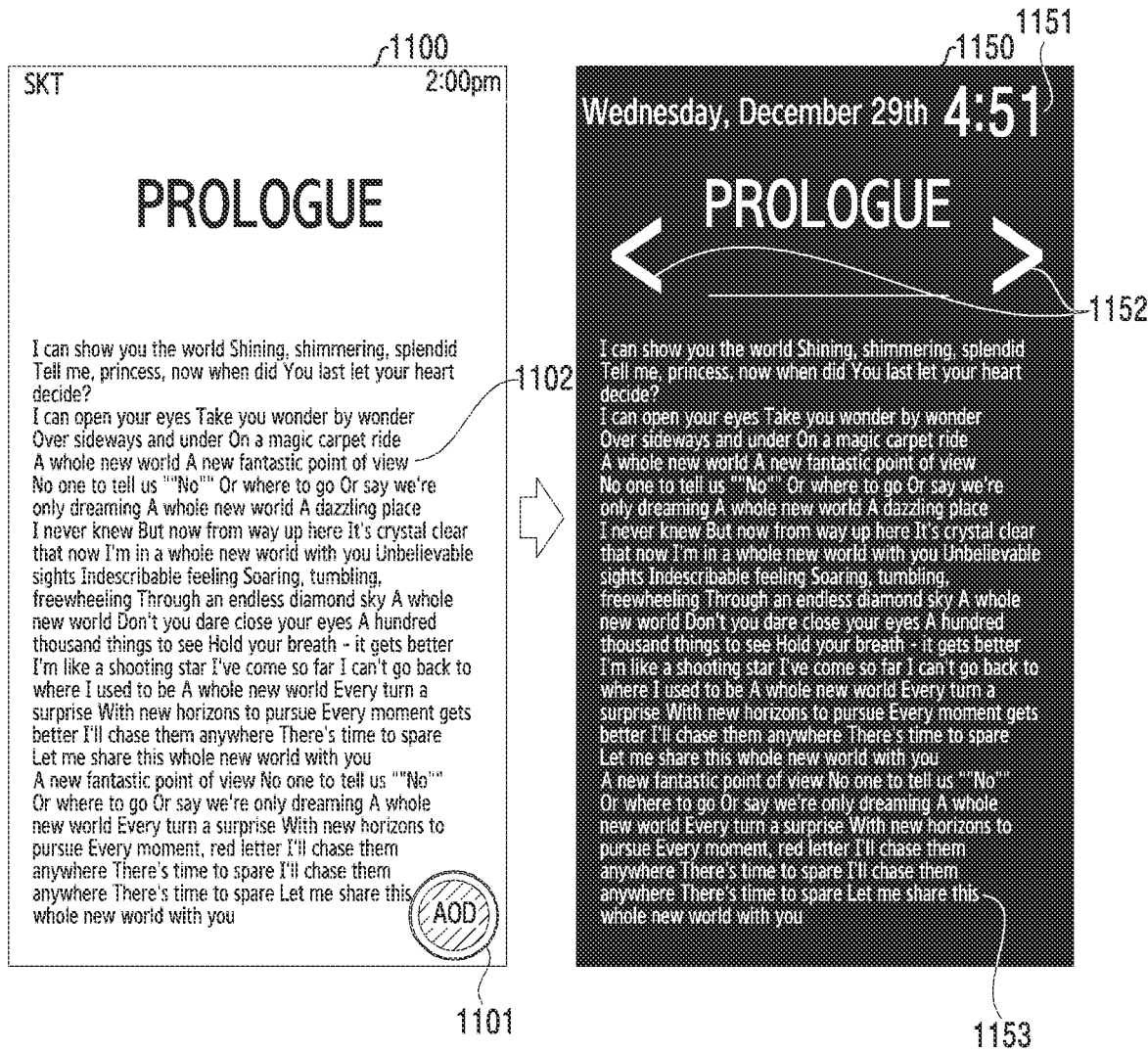
FIG. 11 illustrates another example of a screen transition based on a transition to an AOD mode, in an electronic device according to various embodiments.

FIG. 11 illustrates another example of a screen transition based on a transition to an AOD mode, in an electronic device according to various embodiments.

Referring to FIG. 11, the electronic device 101 may display a first screen 1100 in a normal mode. The first screen 1100 may represent an e-book screen.

The electronic device 101 may identify that it is required to change to the AOD mode, while displaying the first screen 1100 in the normal mode. For example, the electronic device 101 may identify that it is required to change to the AOD mode, in response to identifying that a user input is not detected during a specified time in a state in which the first screen 1100 is displayed. As another example, the electronic device 101 may identify that it is required to change to the AOD mode, in response to receiving of a touch input for a visual object 1101 included in the first screen 1100. The visual object 1101 may be a button for providing a current page 1102 of an e-book in a state of the AOD mode, in order to minimize power consumption of the electronic device 101.

The electronic device 101 may generate information on the second screen 1150 which is to transition from the first screen 1100, in response to identifying that it is required to change to the AOD mode. The second screen 1150 may be a screen displayed through a display (e.g., the display 510) in the AOD mode. The second screen 1150 may have a black background to satisfy an OPR less than or equal to a specified level (e.g., 10%). The second screen 1150 may include an object 1151 indicating a current time, content 1153 converted from the current page 1102, and/or an object 1152 that can be scrolled left and right. The second screen 1150 may be generated by performing conversion, for example, image processing (e.g., reserve or black-and-white processing), resizing, or the like on the first screen 1100 in order to satisfy the OPR less than or equal to the specified level. According to some embodiments, the second screen 1150 may include content less in amount than (e.g., part of) content displayed through the first screen 1100. The second screen 1150 may display content previous or subsequent to the content 1153 converted from the current page 1102 (e.g., content converted from a previous page or a next page), based on an input for the object 1152 that can be scrolled left and right. For this, not only the content 1153 converted from the current page 1102 but also the content converted from the previous or next page may be written in a GRAM (e.g., the GRAM 660) of a DDI (e.g., the DDI 530 of FIG. 5). That is, in response to identifying that it is required to change to the AOD mode, the processor 120 may convert the previous page and/or the next page and write the converted page in the GRAM of the DDI, together with the current page 1102.

According to some embodiments, the processor 120 may convert a specified number of previous and/or next pages in consideration of storage capacity of the GRAM. When switching to a previous or next page not stored in the GRAM is requested, the processor 120 may terminate the AOD mode, and may provide the requested previous or next page in the normal mode.

Figure 12:
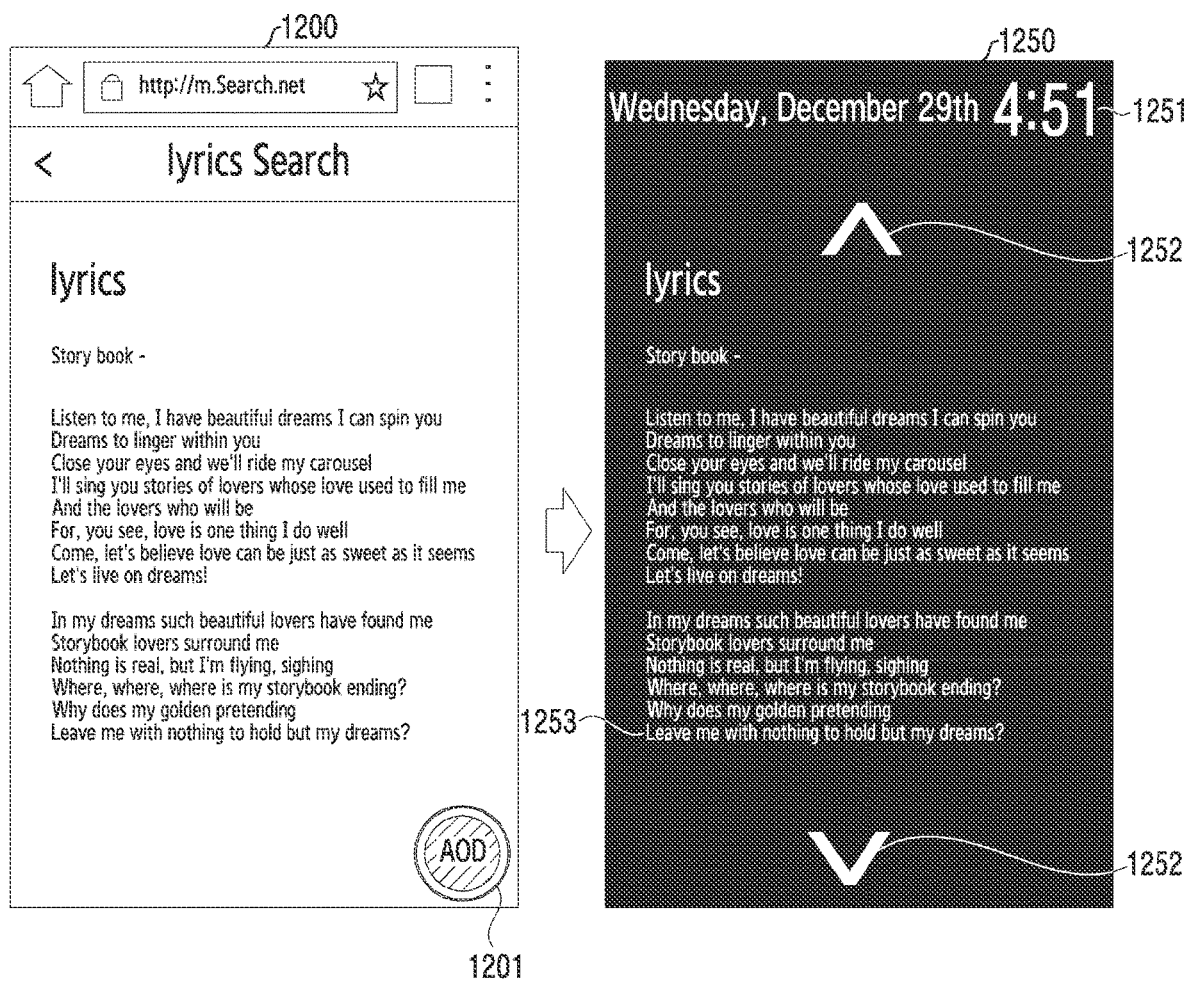
FIG. 12 illustrates another example of a screen transition based on a transition to an AOD mode, in an electronic device according to various embodiments.

FIG. 12 illustrates another example of a screen transition based on a transition to an AOD mode, in an electronic device according to various embodiments.

Referring to FIG. 12, the electronic device 101 may display a first screen 1200 in a normal mode. The first screen 1200 may represent a web browser screen.

The electronic device 101 may identify that it is required to change to the AOD mode, while displaying the first screen 1200 in the normal mode. For example, the electronic device 101 may identify that it is required to change to the AOD mode, in response to identifying that a user input is not detected during a specified time in a state in which the first screen 1200 is displayed. As another example, the electronic device 101 may identify that it is required to change to the AOD mode, in response to receiving of a touch input for a visual object 1201 included in the first screen 1200. The visual object 1201 may be a button for providing a screen (e.g., a second screen 1250) corresponding to the first screen 1200 in a state of the AOD mode, in order to minimize power consumption of the electronic device 101.

The electronic device 101 may generate information on the second screen 1250 which is to transition from the first screen 1200, in response to identifying that it is required to change to the AOD mode. The second screen 1250 may be a screen displayed through a display (e.g., the display 510) in the AOD mode. The second screen 1250 may have a black background to satisfy an OPR less than or equal to a specified level (e.g., 10%). The second screen 1250 may include an object 1251 indicating a current time, content 1253 converted from at least part of the first screen 1200, and/or an object 1252 that can be scrolled up and down. Although not shown, the second screen 1250 may be generated by performing conversion, for example, image processing (e.g., reserve or black-and-white processing), resizing, or the like on the first screen 1200 in order to satisfy the OPR less than or equal to the specified level. According to some embodiments, the second screen 1250 may include content less in amount than content displayed through the first screen 1200. The second screen 1250 may display content previous or subsequent to the content 1253 displayed on the second screen 1250, based on an input for the object 1252 that can be scrolled up and down. For this, not part of a webpage displayed on the first screen but the entirety of the converted webpage may be written in a GRAM (e.g., the GRAM 660) of a DDI (e.g., the DDI 530 of FIG. 5). That is, in response to identifying that it is required to change to the AOD mode, the processor 120 may convert the entirety of the webpage displayed on the first screen 1200 so as to be written in the GRAM of the DDI.

According to some embodiments, the processor 120 may convert only text information, except for photos or moving pictures included in the webpage, in consideration of storage capacity of the GRAM. When an image or moving picture which is not stored in the GRAM is requested to be displayed or reproduced, the processor 120 may terminate the AOD mode, and may operate in the normal mode.

Figure 13:
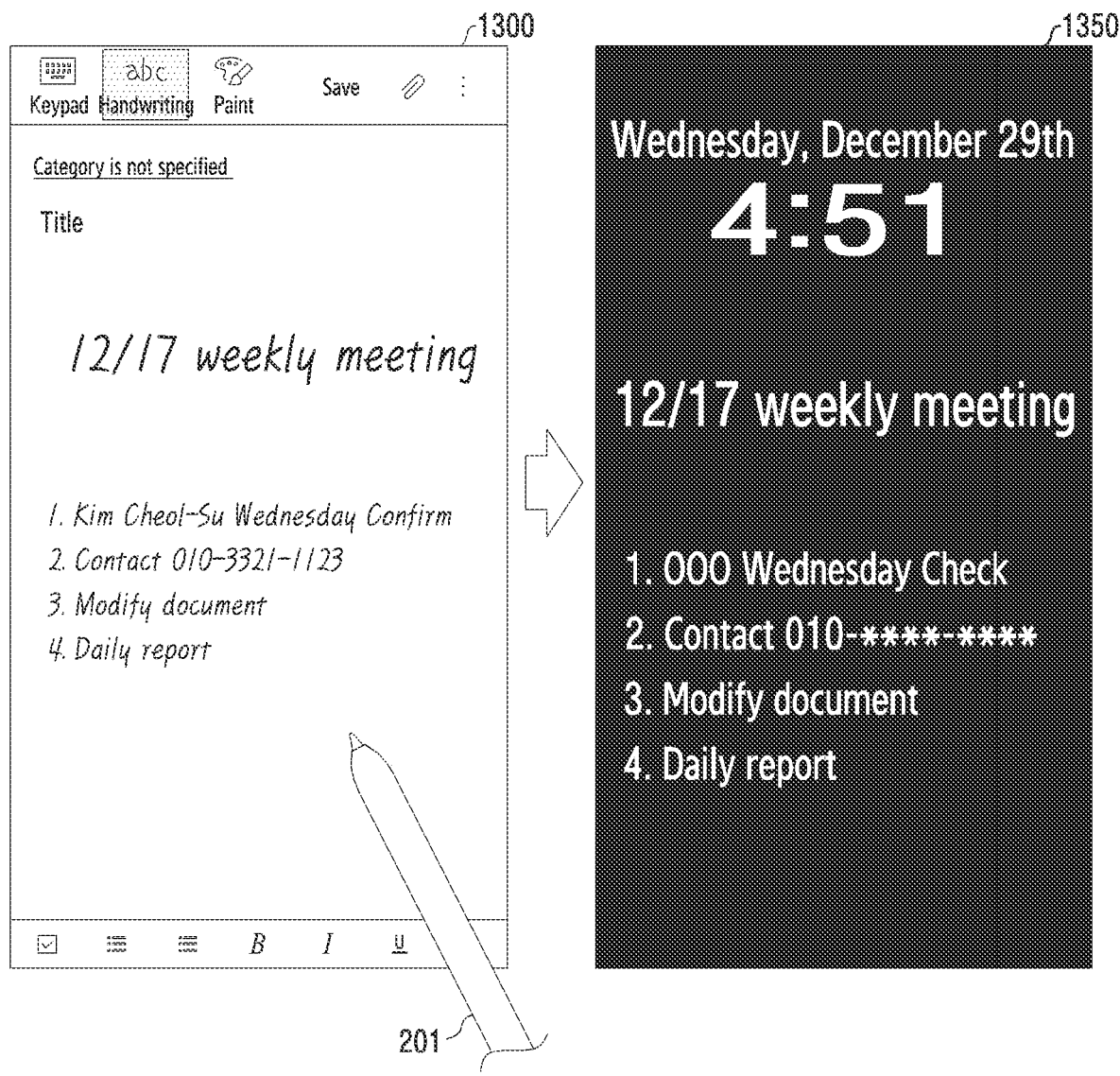
FIG. 13 illustrates another example of a screen transition based on a transition to an AOD mode, in an electronic device according to various embodiments.

FIG. 13 illustrates another example of a screen transition based on a transition to an AOD mode, in an electronic device according to various embodiments.

Referring to FIG. 13, the electronic device 101 may display a first screen 1300 in a normal mode. The first screen 1300 may represent a memo application screen.

The electronic device 101 may identify that it is required to change to the AOD mode, while displaying the first screen 1300 in the normal mode. For example, the electronic device 101 may identify that it is required to change to the AOD mode, in response to identifying that a user input is not detected during a specified time in a state in which the first screen 1300 is displayed. As another example, the electronic device 101 may identify that it is required to change to the AOD mode, in response to receiving of a touch input for a visual object (not shown) included in the first screen 1300.

The electronic device 101 may generate information on a second screen 1350 which is to transition from the first screen 1300, in response to identifying that it is required to change to the AOD mode. The second screen 1350 may be a screen displayed through a display (e.g., the display 510) in the AOD mode.

In order to protect personal information in the AOD mode, the processor 120 of the electronic device 101 may limit displaying of the personal information in the second screen 1350. For example, the processor 120 may recognize (e.g., OCR) a text input by a user on the first screen 1300, in response to identifying that it is required to change to the AOD mode. The processor 120 may identify content corresponding to the personal information, among texts input by the user on the first screen 1300, based on the recognition. When the information on the second screen 1350 is generated from the first screen 1300, the processor 120 may generate information on the second screen 1350, so that the identified personal information is not exposed. The processor 120 may transfer the information on the second screen 1350 converted not to expose the identified personal information (e.g., a name, a phone number) to a GRAM (e.g., the GRAM 660) of a DDI (e.g., the DDI 530), based on the entering the AOD mode.

According to an embodiment, the electronic device 101 may identify information to be hidden in an AOD screen, based on receiving of a specified input in a memo application. The specified input may be, for example, a special symbol (e.g., parenthesis), a character, a symbol, an underscore, a strikethrough, or the like. For example, the electronic device 101 may receive a handwriting input of the user through the memo application, and may recognize a specific portion of the handwriting input as personal information, based on identifying that a parenthesis, an underscore, or a strikethrough is input for the specific portion.

According to some embodiments, the memo application may provide a menu which allows to select a portion for limiting the displaying in the AOD mode after a handwriting input. After the menu is executed, the processor 120 may recognize the portion selected by the specified input as personal information.

According to some embodiments, the electronic device 101 may provide part (e.g., a today's to-do-list or schedule) of information stored in various applications (e.g., a to-do-list application, a schedule application, a post-it application) in the AOD mode. In this case, the electronic device 101 may provide the part of information so that specified information (e.g., personal information) is not exposed.

Figure 14:
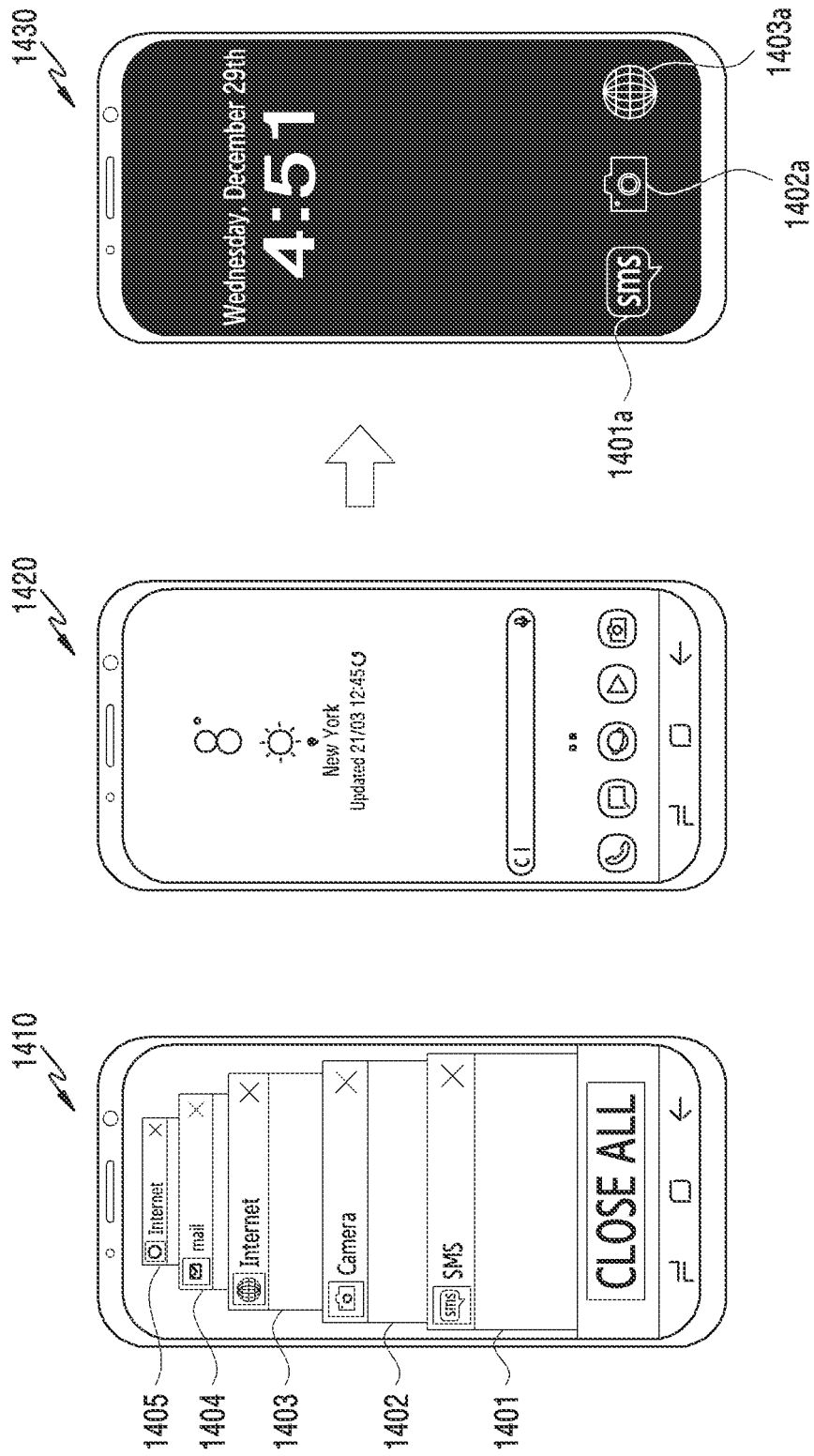
FIG. 14 illustrates another example of a screen transition based on a transition to an AOD mode, in an electronic device according to various embodiments.

FIG. 14 illustrates another example of a screen transition based on a transition to an AOD mode, in an electronic device according to various embodiments.

Referring to FIG. 14, the electronic device 101 may be in a state in which a plurality of applications are executed, in response to a user's request. For example, as indicated by a reference numeral 1410 in the figure, it can be seen that a first application 1401, a second application 1402, a third application 1403, a fourth application 1404, and a fifth application 1405 have been executed in the electronic device 101.

As indicated by a reference numeral 1420 in the figure, according to the user's request (e.g., a home key input), the electronic device 101 may output a home screen (or a standby screen) in which applications have not been executed.

When the transition to (or entering) the AOD mode is requested in a state in which the home screen is displayed (e.g., when a specified time elapses without a user input or when a specified key, gesture, or motion is input), the processor 120 of the electronic device 101 may generate information on a second screen, based on information of the first to fifth applications 1401 to 1405 being executed in a background. Herein, the information on the second screen may be information (e.g., a shortcut icon) to be executed immediately in the second screen. For example, the processor 120 may extract information on a specified number (e.g., 3) of applications most recently executed. According to some embodiments, the processor 120 may generate the information on the second screen, based on a usage history (e.g., a frequency of use) of the application.

When the generating of the information on the second screen is complete, the processor 120 may write the generated information on the second screen in a memory (e.g., the memory 533) or a DDI (e.g., the DDI 530), and may enter an inactive state (e.g., a low power state).

When the processor 120 enters the inactive state, the DDI may display the second screen on a display (e.g., the display 510), based on the information on the second screen and stored in the memory. For example, as indicated by a reference numeral 1403, the DDI may display the second screen including icons 1401*a*, 1402*a*, and 1403*a* of the first to third applications 1401 to 1403 on the display.

When one of the shortcut icons 1401*a*, 1402*b*, and 1403*a* is selected (e.g., double-touched), the processor 120 of the electronic device 101 may transition to an active state to execute a corresponding application, and may display an execution screen on the display.

Figure 15:
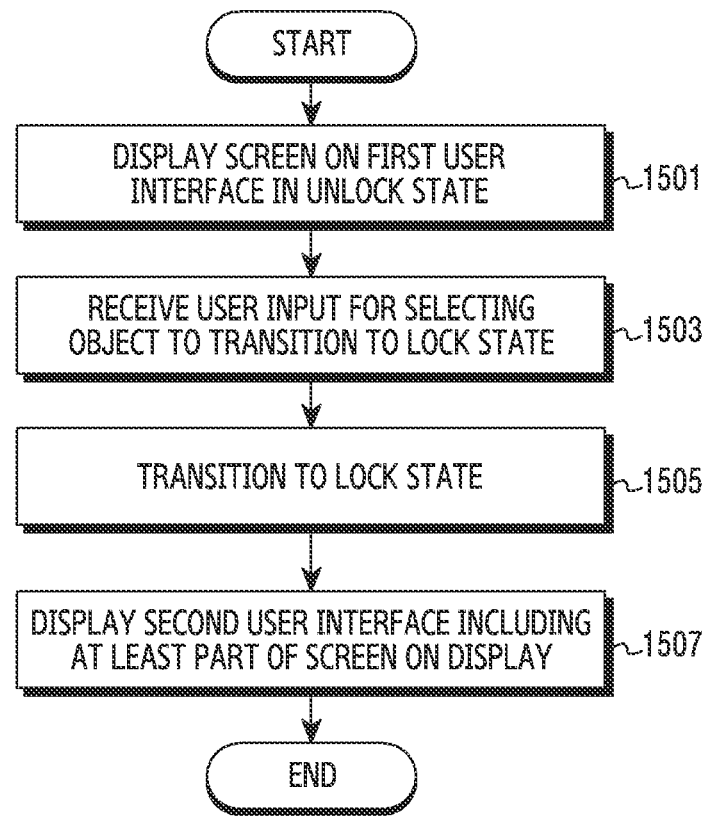
FIG. 15 is a flowchart illustrating a method of providing information in an AOD mode, in an electronic device according to various embodiments.

FIG. 15 is a flowchart illustrating a method of providing information in an AOD mode, in an electronic device according to various embodiments.

Prior to the detailed description, an electronic device (e.g., the electronic device 101) according to an embodiment of the present invention may include a housing, a touchscreen display (e.g., the display device 160) viewed or exposed through part of the housing, a wireless communication circuit (e.g., the wireless communication module 192) located inside the housing, a processor (e.g., the processor 120) located inside the housing and operatively coupled with the touchscreen display and the wireless communication circuit, and a memory (e.g., the memory 130, the memory 553, or the GRAM 660) located inside the housing and operatively coupled with the processor.

Referring to FIG. 15, in operation 1501, a processor of an electronic device according to an embodiment of the present invention may display a screen (e.g., a first screen) on a first user interface in an unlock state (e.g., an active state). For example, the processor may display the screen on the first user interface, in response to executing of an application program including an object for transitioning to a lock state (e.g., an inactive state) and including the first user interface. The application program may receive an input of a stylus pen (e.g., the digital pen 201).

In operation 1503, the processor according to an embodiment of the present invention may receive a user input for selecting the object for transitioning to the lock state. For example, the processor may receive the user input for selecting the object through the first user interface in the unlock state of the electronic device.

In operation 1505, the processor according to an embodiment of the present invention may transition to the lock state.

In operation 1507, the processor according to an embodiment of the present invention may display a second user interface including at least part of the screen on the display in the lock state. For example, the second user interface may include at least part of the first user input including a text and/or drawing input received through the first user interface in the unlock state of the electronic device. The second user interface may include a black background substantially.

According to some embodiments, the processor may write (or store) the second interface in a memory. When the processor is in the inactive state, a DDI may display the second user interface stored in the memory on the display.

Figure 16:
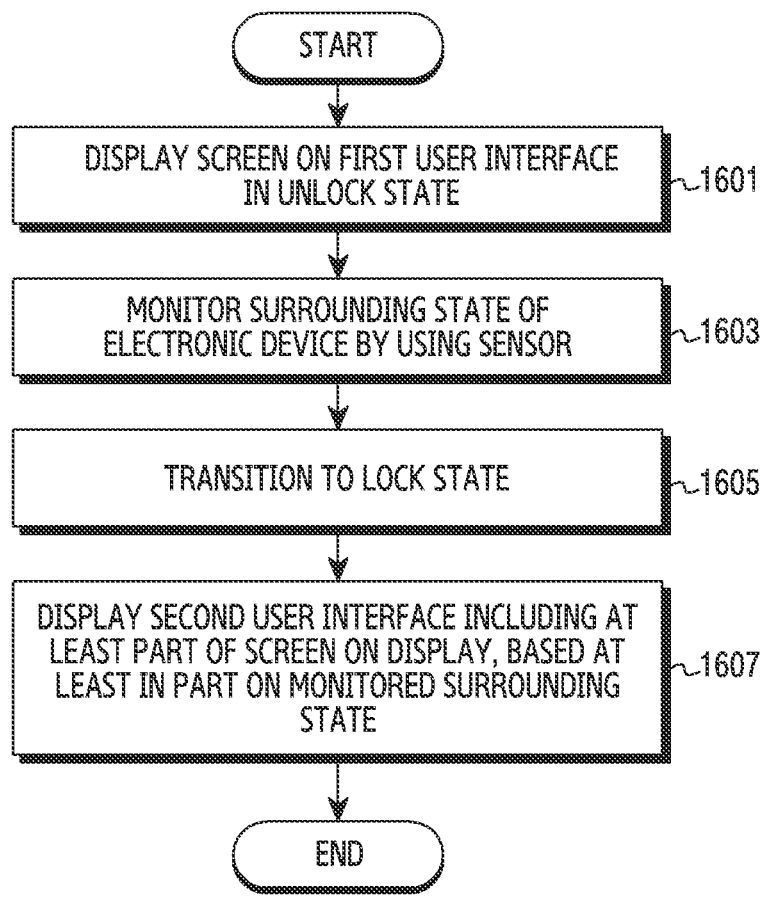
FIG. 16 is a flowchart illustrating another method of providing information in an AOD mode, in an electronic device according to various embodiments.

FIG. 16 is a flowchart illustrating another method of providing information in an AOD mode, in an electronic device according to various embodiments.

Prior to the detailed description, an electronic device (e.g., the electronic device 101) according to an embodiment of the present invention may include a housing, a touchscreen display (e.g., the display device 160) viewed or exposed through part of the housing, a sensor (e.g., the sensor module 176) located inside the housing, a wireless communication circuit (e.g., the wireless communication module 192) located inside the housing, a processor (e.g., the processor 120) located inside the housing and operatively coupled with the touchscreen display, the sensor, and the wireless communication circuit, and a memory (e.g., the memory 130, the memory 553, or the GRAM 660) located inside the housing and operatively coupled with the processor.

Referring to FIG. 16, in operation 1601, a processor of an electronic device according to an embodiment of the present invention may display a screen (e.g., a first screen) on a first user interface in an unlock state (e.g., an active state). The application program may receive an input of a stylus pen (e.g., the digital pen 201).

In operation 1603, the processor according to an embodiment of the present invention may monitor a surrounding state of the electronic device by using a sensor. For example, the processor may monitor a surrounding state (e.g., a presence of a person) and a place in which the electronic device is located through a position sensor, a microphone, and/or an image sensor. For example, the processor may identify whether the transition to the lock state (e.g., the inactive state) is requested in a specified place (e.g., a lecture room, a conference room, etc.) through the position sensor, and may identify whether there is a person in the vicinity through the microphone and/or the image sensor.

In operation 1605, the processor according to an embodiment of the present invention may allow the electronic device to transition to the lock state. For example, the processor may allow the electronic device to transition to the lock state when a specified condition is satisfied.

In operation 1607, the processor according to an embodiment of the present invention may display a second user interface including at least part of a screen on the display, based at least in part on the monitored surrounding state. For example, the processor may display the second user interface on the display when the transition to the lock state is requested in a state in which a current location identified through the position sensor is within a specified range (or place) and a user is present in the vicinity through the microphone and/or the image sensor. On the other hand, the processor may display the second interface on the display or may display not the second user interface but a specified user interface, so that part of the screen is not exposed, when the transition to the lock state is requested in a state in which the current location identified through the position sensor is within the specified range (or place) and the user is not present in the vicinity through the microphone and/or the image sensor. Such an embodiment of the present invention may prevent important content (e.g., personal information, security information, etc.) from being exposed to the outside in a state in which the user is not present.

According to an embodiment, the processor may display, on the display, a second user interface including at least part of a first user input including a text and/or drawing input received through a first user interface in an unlock state of the electronic device, based at least in part on the monitored surrounding state.

According to some embodiments, the processor may receive a second user input including a specific indicator (e.g., a specified input) through the first user interface in the unlock state of the electronic device, determine at least one region of the screen corresponding to the second user input on the first user interface in response to the received second user input, and display the second user interface on the display so as not to include the determined region of the screen, based in part on the determination. The specified indicator may include a gesture input through a stylus (e.g., the digital pen 201). For example, the specific indicator may include a special symbol, a character, a symbol, and/or an underscore.

The second user interface may include a black background substantially.

According to some embodiments, the processor may write (or store) the second interface in the memory. When the processor is in the inactive state, a DDI may display, on the display, the second user interface which is written in the memory.

According to various embodiments of the present invention, an electronic device (e.g., the electronic device 101) may comprise: a housing; a display panel (e.g., the display device 160) exposed through part of the housing; a display driver Integrated Circuit (IC) (e.g., the display driver IC 550) for driving the display panel; a processor (e.g., the processor 120) located inside the housing and operatively coupled to the display panel and the display driver IC; and a memory (e.g., the memory 130, the memory 553, or the GRAM 660) located inside the housing and operatively coupled to the processor and the display driver IC. The memory may store instructions, when executed, causing the processor to: display a first screen through the display panel; identify whether there is a request for entering a low power state; generate information on a second screen including at least part of the first screen and write the information in the memory, in response to the request for entering the low power state; and enter the low power state in response to writing the information. The memory may store instructions, when executed, causing the display driver IC to display the second screen through the display panel, based on the information, written in the memory, on the second screen, while the processor is in the low power state.

According to various embodiments, the instructions may cause the processor to extract content to be displayed through the second screen, based at least in part on at least one content included in the first screen, in response to the request for entering the low power state.

According to various embodiments, the instructions may cause the processor to generate the information on the second screen, by resizing the extracted content.

According to various embodiments, the extracted content may be a user's handwriting input. The instructions may cause the processor to convert the handwriting input to text data, and generate the information on the second screen including the converted text data.

According to various embodiments, the extracted content may be a user's handwriting input. The instructions may cause the processor to adjust a thickness of the handwriting input, and generate the information on the second screen including the handwriting input of which the thickness is adjusted.

According to various embodiments, the instructions may cause the processor to identify content corresponding to personal information in the extracted content, and generate the information on the second screen by limiting the displaying of the content corresponding to the personal information, based at least in part on the identification.

According to various embodiments, the instructions may cause the processor to receive a specified user input on part of the extracted content, and generate the information on the second screen by limiting the displaying of the part of the extracted content, in response to receiving of the specified user input.

According to various embodiments, the second screen may be generated to satisfy an On Pixel Ratio (OPR) less than or equal to a specified level.

According to various embodiments, the instructions may cause the processor to extract part of content included in the first screen, resize the extracted part of the content, and generate the information on the second screen by changing a color of the extracted part of content so that the second screen satisfies an OPR less than or equal to a specified level.

According to various embodiments, the instructions may cause the processor to further write information on a third screen in the memory, together with the information on the second screen, so as to be displayed through the display panel in the low power state. The instructions may cause the display driver IC to display the third screen, in response to receiving of a user input on the second screen, while the processor is in the low power state.

According to various embodiments of the present invention, an electronic device (e.g., the electronic device 101) may include: a housing; a touchscreen display (e.g., the display device 160) viewed or exposed through part of the housing; a wireless communication circuit (e.g., the wireless communication module 192) located inside the housing; a processor (e.g., the processor 120) located inside the housing and operatively coupled with the touchscreen display and the wireless communication circuit; and a memory (e.g., the memory 130, the memory 553, or the GRAM 660) located inside the housing and operatively coupled with the processor. The memory may be configured to store an application program including a first user interface including an object for transitioning to a lock state. The memory may store instructions, when executed, causing the processor to display a screen on a first user interface in an unlock state of the electronic device, receive a user input for selecting the object through the first user interface in the unlock state of the electronic device, transit the electronic device from the unlock state to a lock state, and display, in the lock state, a second user interface including at least part of the screen on the display.

According to various embodiments, the instructions may cause the processor to write the second user interface in the memory.

According to various embodiments, the instructions may cause the processor to receive a first user input including a text and/or drawing input through the first user interface in the unlock state of the electronic device, and display a second user interface including at least part of the first user input on the display, in response to a user input of selecting the object.

According to various embodiments, the application program may include an application program configured to receive an input of a stylus pen (e.g., the digital pen 201).

According to various embodiments, the second user interface may include a black background substantially.

According to various embodiments of the present invention, an electronic device (e.g., the electronic device 101) may comprise: a housing; a touchscreen display (e.g., the display device 160) viewed or exposed through part of the housing; at least one sensor (e.g., the sensor module 176); a wireless communication circuit (e.g., the wireless communication module 192) located inside the housing; a processor (e.g., the processor 120) located inside the housing and operatively coupled with the touchscreen display, the sensor, and the wireless communication circuit; and a memory (e.g., the memory 130, the memory 553, or the GRAM 660) located inside the housing and operatively coupled with the processor. The memory may store instructions, when executed, causing the processor to display a screen on a first user interface in an unlock state of the electronic device, monitor a surrounding state of the electronic device by using the sensor, transit the electronic device from the unlock state to a lock state, and display, in the lock state, a second user interface including at least part of the screen on the display based at least in part on the monitored surrounding state.

According to various embodiments, the instructions may cause the processor to receive a first user input including a text and/or drawing input through the first user interface in the unlock state of the electronic device, and display a second user interface including at least part of the first user input on the display, based at least in part on the monitored surrounding state.

According to various embodiments, the instructions may cause the processor to receive a second user input including a specific indicator through the first user interface in the unlock state of the electronic device, determine at least part region, corresponding to the second user input on the first user interface, of the screen in response to the received second user input, and display the second user interface on the display so as not to include the determined region of the screen, based at least in part on the determination.

According to various embodiments, the specific indicator may include a special symbol, a character, a symbol, and/or an underscore.

According to various embodiments, the sensor may include a position sensor, a microphone, and/or an image sensor.

While the disclosure has been shown and described with reference to certain preferred embodiments thereof, it will be understood by those skilled in the art that various changes in form and details may be made therein without departing from the spirit and scope of the disclosure as defined by the appended claims. Therefore, the scope of the disclosure is defined not by the detailed description thereof but by the appended claims, and all differences within equivalents of the scope will be construed as being included in the disclosure.

The invention claimed is:

1. An electronic device comprising:
  a housing;
  a display panel exposed through part of the housing;
  a display driver Integrated Circuit (IC) for driving the display panel;
  a processor located inside the housing and operatively coupled to the display panel and the display driver IC; and
  a memory located inside the housing and operatively coupled to the processor and the display driver IC,
  wherein the memory stores instructions that, when executed, cause the processor to:
    display a first screen through the display panel,
    identify whether there is a request for entering a low power state,
    generate information on a second screen including at least part of the first screen and write the information in the memory, in response to the request for entering the low power state, and enter the low power state in response to writing the information; and causing the display driver IC to display the second screen through the display panel, based on the information, written in the memory, while the processor is in the low power state.

2. The electronic device of claim 1, wherein the instructions further cause the processor to extract content to be displayed through the second screen, based at least in part on at least one content included in the first screen, in response to the request for entering the low power state.

3. The electronic device of claim 2, wherein the instructions further cause the processor to generate the information on the second screen, by resizing the extracted content.

4. The electronic device of claim 2,
wherein the extracted content is a user's handwriting input, and
wherein the instructions further cause the processor to:
convert the handwriting input to text data, and
generate the information on the second screen including the converted text data.

5. The electronic device of claim 2,
wherein the extracted content is a user's handwriting input, and
wherein the instructions further cause the processor to:
adjust a thickness of the handwriting input, and
generate the information on the second screen including the handwriting input of which the thickness is adjusted.

6. The electronic device of claim 2, wherein the instructions further cause the processor to:
identify content corresponding to personal information in the extracted content, and
generate the information on the second screen by limiting the displaying of the content corresponding to the personal information, based at least in part on the identification.

7. The electronic device of claim 2, wherein the instructions further cause the processor to:
receive a specified user input on part of the extracted content, and
generate the information on the second screen by limiting the displaying of the part of the extracted content, in response to receiving of the specified user input.

8. The electronic device of claim 1, wherein the second screen is generated to satisfy an On Pixel Ratio (OPR) less than or equal to a specified level.

9. The electronic device of claim 1, wherein the instructions further cause the processor to:
extract part of content included in the first screen, resize the extracted part of the content, and
generate the information on the second screen by changing a color of the extracted part of content so that the second screen satisfies an OPR less than or equal to a specified level.

10. The electronic device of claim 1, wherein the instructions further cause the processor to:
further write information on a third screen in the memory, together with the information on the second screen, so as to be displayed through the display panel in the low power state, and
cause the display driver IC to display the third screen, in response to receiving of a user input on the second screen, while the processor is in the low power state.

11. An electronic device comprising:
a housing;
a touchscreen display viewed or exposed through part of the housing;
at least one sensor;
a processor located inside the housing and operatively coupled with the touchscreen display and the sensor; and
a memory located inside the housing and operatively coupled with the processor,
wherein the memory stores instructions that, when executed, cause the processor to:
display a first screen on a first user interface in an active state of the electronic device,
monitor a surrounding state of the electronic device by using the sensor,
transit the electronic device from the active state to an inactive state, wherein the inactive state corresponds to a low power state,
display, in the inactive state, a second user interface including at least part of the first screen on the display, in response to the monitored surrounding state satisfying a specified condition, and
display, in the inactive state, a third user interface not including the first screen on the display, in response to the monitored surrounding state not satisfying the specified condition, and
wherein the instructions further cause the processor to:
receive a first user input including a specific indicator through the first user interface in the active state of the electronic device,
determine a region of the first screen, corresponding to the first user input on the first user interface, in response to the received first user input, and
display, in the inactive state, the third user interface on the display so as not to include the determined region of the first screen, based at least in part on the determination.

12. The electronic device of claim 11, wherein the instructions further cause the processor to:
receive a second user input including at least one of a text input or a drawing input through the first user interface in the active state of the electronic device, and
display, in the inactive state, a second user interface including at least part of the second user input on the display, based at least in part on the monitored surrounding state.

13. The electronic device of claim 11, wherein the specific indicator includes at least one of a special symbol, a character, a symbol, and an underscore.

14. The electronic device of claim 11, wherein the sensor includes at least one of a position sensor, a microphone, or an image sensor.

* * * * *